United States Patent
Kaneko et al.

(10) Patent No.: US 11,536,922 B2
(45) Date of Patent: Dec. 27, 2022

(54) INTERMITTENTLY CONNECTED OPTICAL FIBER RIBBON AND METHOD FOR MANUFACTURING INTERMITTENTLY CONNECTED OPTICAL FIBER RIBBON

(71) Applicant: FUJIKURA LTD., Tokyo (JP)

(72) Inventors: Soichiro Kaneko, Chiba (JP); Koji Tomikawa, Chiba (JP); Ken Osato, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/632,711

(22) PCT Filed: Oct. 30, 2019

(86) PCT No.: PCT/JP2019/042515
§ 371 (c)(1),
(2) Date: Feb. 3, 2022

(87) PCT Pub. No.: WO2021/084640
PCT Pub. Date: May 6, 2021

(65) Prior Publication Data
US 2022/0269023 A1    Aug. 25, 2022

(51) Int. Cl.
*G02B 6/44* (2006.01)
(52) U.S. Cl.
CPC ................. *G02B 6/448* (2013.01)
(58) Field of Classification Search
CPC ..................................... G02B 6/448
USPC ......................................... 385/114
See application file for complete search history.

(56) References Cited

U.S. PATENT DOCUMENTS

| | | | |
|---|---|---|---|
| 6,004,675 A | 12/1999 | Akasaka et al. | |
| 2005/0201697 A1* | 9/2005 | Tanaka | G02B 6/08 385/128 |
| 2008/0292248 A1 | 11/2008 | Suzuki et al. | |
| 2017/0285285 A1 | 10/2017 | Hoshino et al. | |
| 2017/0285287 A1 | 10/2017 | Murata et al. | |
| 2019/0285823 A1* | 9/2019 | Tanaka | G02B 6/44 |

FOREIGN PATENT DOCUMENTS

| | | |
|---|---|---|
| CN | 101311758 A | 11/2008 |
| CN | 109844597 A | 6/2019 |
| EP | 2770357 A1 | 8/2014 |

(Continued)

OTHER PUBLICATIONS

Office Action issued in related Taiwanese Application No. 108139883 dated Nov. 6, 2020 (4 pages).

(Continued)

*Primary Examiner* — Jerry M Blevins
(74) *Attorney, Agent, or Firm* — Osha Bergman Watanabe & Burton LLP

(57) ABSTRACT

An intermittently connected optical fiber ribbon includes optical fibers, disposed side by side in a width direction of the optical fibers, and connecting portions that each intermittently connect two adjacent ones of the optical fibers. A center-to-center distance between any of the two adjacent ones of the optical fibers is greater than a diameter of the individual optical fibers. A total volume shrinkage per meter per 1° C. of the connecting portions of a single one of the optical fibers is 0.00070 mm$^3$/m·° C. or lower.

5 Claims, 17 Drawing Sheets

(56) References Cited

FOREIGN PATENT DOCUMENTS

| | | |
|---|---|---|
| JP | 2009-510520 A | 3/2009 |
| JP | 2010-008923 A | 1/2010 |
| JP | 2010-117592 A | 5/2010 |
| JP | 2013-088617 A | 5/2013 |
| JP | 2014-010439 A | 1/2014 |
| JP | 2014-157382 A | 8/2014 |
| JP | 2015-219355 A | 12/2015 |
| JP | 2016-001338 A | 1/2016 |
| JP | 2016075746 A | 5/2016 |
| JP | 2016-184170 A | 10/2016 |
| JP | 2017-026754 A | 2/2017 |
| TW | 201915529 A | 4/2019 |
| WO | 2018/117068 A1 | 6/2018 |
| WO | 2018/182670 A1 | 10/2018 |

OTHER PUBLICATIONS

International Search Report issued in corresponding International Application No. PCT/JP2019/042515 dated Dec. 17, 2019 (4 pages).

* cited by examiner

| PARAMETER NAME | DEFINITION | HOW TO FIND |
|---|---|---|
| CONNECTED FIBER COUNT n [FIBER] | NUMBER OF OPTICAL FIBERS AS UNIT OF CONNECTING | n = 1 (SINGLE FIBER) OR n = 2 (TWO FIBERS) |
| CONNECTING PITCH p [mm] | CENTER-TO-CENTER DISTANCE BETWEEN CONNECTING PORTIONS IN LONGITUDINAL DIRECTION | MEASURED VALUE |
| CONNECTING-PORTION LENGTH a [mm] | LENGTH OF CONNECTING PORTION | MEASURED VALUE |
| FIBER DIAMETER D [μm] | DIAMETER OF OPTICAL FIBER | MEASURED VALUE |
| CENTER-TO-CENTER DISTANCE L [mm] | CENTER-TO-CENTER DISTANCE BETWEEN OPTICAL FIBERS | MEASURED VALUE |
| SPACING DISTANCE C [mm] | SPACING DISTANCE BETWEEN OUTER CIRCUMFERENTIAL SURFACES OF OPTICAL FIBERS | MEASURED VALUE (NOTE: C = L − D) |
| CONNECTING-PORTION YOUNG'S MODULUS E [MPa] | YOUNG'S MODULUS OF CONNECTING PORTION | NOMINAL VALUE |
| CONNECTING-PORTION SHRINKAGE RATE A [/°C] | THERMAL SHRINKAGE RATE OF CONNECTING PORTION PER 1 °C | MEASURED VALUE |
| CONNECTING-PORTION CROSS-SECTIONAL AREA S [mm²] | CROSS-SECTIONAL AREA OF CONNECTING PORTION | MEASURED VALUE |
| CONNECTING PROPORTION R | PROPORTION OF CONNECTING PORTIONS EXISTING IN LONGITUDINAL DIRECTION | = (a/p) * (2/n) |
| VOLUME SHRINKAGE AMOUNT Vc [mm³/piece·°C] | SHRINKAGE AMOUNT OF EACH CONNECTING PORTION | = S * a * A |
| TOTAL VOLUME SHRINKAGE AMOUNT Vf [mm³/m·°C] | TOTAL OF VOLUME SHRINKAGE AMOUNTS OF CONNECTING PORTIONS PER UNIT LENGTH OF SINGLE OPTICAL FIBER | = Vc * (1000/p) * (2/n) = 1000 × S × A × R |

FIG. 6

| | COMPARATIVE EXAMPLE 1 | EXAMPLE 1A | EXAMPLE 1B |
|---|---|---|---|
| CONNECTED FIBER COUNT n [FIBER] | 1 | 1 | 1 |
| CONNECTING PITCH p [mm] | 50 | 50 | 50 |
| CONNECTING-PORTION LENGTH a [mm] | 10 | 10 | 10 |
| FIBER DIAMETER D [μm] | 205 | 205 | 205 |
| CENTER-TO-CENTER DISTANCE L [mm] | 0.280 | 0.280 | 0.280 |
| SPACING DISTANCE C [mm] | 0.075 | 0.075 | 0.075 |
| CONNECTING-PORTION YOUNG'S MODULUS E [MPa] | 900 | 900 | 900 |
| CONNECTING-PORTION SHRINKAGE RATE A [/°C] | 0.00011 | 0.00011 | 0.00011 |
| CONNECTING-PORTION CROSS-SECTIONAL AREA S [mm$^2$] | 0.018 | 0.011 | 0.008 |
| CONNECTING PROPORTION R | 0.40 | 0.40 | 0.40 |
| VOLUME SHRINKAGE AMOUNT Vc [mm$^3$/piece·°C] | 0.000020 | 0.000012 | 0.000009 |
| TOTAL VOLUME SHRINKAGE AMOUNT Vf [mm$^3$/m·°C] | 0.00080 | 0.00049 | 0.00036 |
| EVALUATION RESULT (LOSS FLUCTUATION AMOUNT [dB/km]) | POOR (0.08) | GOOD (0.05) | GOOD (0.02) |

FIG. 9

| | COMPARATIVE EXAMPLE 2A | COMPARATIVE EXAMPLE 2B (COMPARATIVE EXAMPLE 1) | EXAMPLE 2A | EXAMPLE 2B |
|---|---|---|---|---|
| CONNECTED FIBER COUNT n [FIBER] | 1 | 1 | 1 | 1 |
| CONNECTING PITCH p [mm] | 50 | 50 | 50 | 50 |
| CONNECTING-PORTION LENGTH a [mm] | 10 | 10 | 10 | 10 |
| FIBER DIAMETER D [μm] | 205 | 205 | 205 | 205 |
| CENTER-TO-CENTER DISTANCE L [mm] | 0.280 | 0.280 | 0.280 | 0.280 |
| SPACING DISTANCE C [mm] | 0.075 | 0.075 | 0.075 | 0.075 |
| CONNECTING-PORTION YOUNG'S MODULUS E [MPa] | 1200 | 900 | 700 | 500 |
| CONNECTING-PORTION SHRINKAGE RATE A [/°C] | 0.00015 | 0.00011 | 0.00009 | 0.00006 |
| CONNECTING-PORTION CROSS-SECTIONAL AREA S [mm²] | 0.018 | 0.018 | 0.018 | 0.018 |
| CONNECTING PROPORTION R | 0.40 | 0.40 | 0.40 | 0.40 |
| VOLUME SHRINKAGE AMOUNT Vc [mm³/piece·°C] | 0.000027 | 0.000020 | 0.000016 | 0.000011 |
| TOTAL VOLUME SHRINKAGE AMOUNT Vf [mm³/m·°C] | 0.00107 | 0.00080 | 0.00063 | 0.00045 |
| EVALUATION RESULT (LOSS FLUCTUATION AMOUNT [dB/km]) | POOR (0.10) | POOR (0.08) | GOOD (0.03) | GOOD (0.02) |

FIG. 10

| | COMPARATIVE EXAMPLE 3 (COMPARATIVE EXAMPLE 1) | EXAMPLE 3A | EXAMPLE 3B |
|---|---|---|---|
| CONNECTED FIBER COUNT n [FIBER] | 1 | 1 | 1 |
| CONNECTING PITCH p [mm] | 50 | 70 | 150 |
| CONNECTING-PORTION LENGTH a [mm] | 10 | 12 | 20 |
| FIBER DIAMETER D [μm] | 205 | 205 | 205 |
| CENTER-TO-CENTER DISTANCE L [mm] | 0.280 | 0.280 | 0.280 |
| SPACING DISTANCE C [mm] | 0.075 | 0.075 | 0.075 |
| CONNECTING-PORTION YOUNG'S MODULUS E [MPa] | 900 | 900 | 900 |
| CONNECTING-PORTION SHRINKAGE RATE A [/°C] | 0.00011 | 0.00011 | 0.00011 |
| CONNECTING-PORTION CROSS-SECTIONAL AREA S [mm²] | 0.018 | 0.018 | 0.018 |
| CONNECTING PROPORTION R | 0.40 | 0.34 | 0.27 |
| VOLUME SHRINKAGE AMOUNT Vc [mm³/piece·°C] | 0.000020 | 0.000024 | 0.000040 |
| TOTAL VOLUME SHRINKAGE AMOUNT Vf [mm³/m·°C] | 0.00080 | 0.00069 | 0.00054 |
| EVALUATION RESULT (LOSS FLUCTUATION AMOUNT [dB/km]) | POOR (0.08) | GOOD (0.03) | GOOD (0.01) |

FIG. 11

| | COMPARATIVE EXAMPLE 4A | COMPARATIVE EXAMPLE 4B (COMPARATIVE EXAMPLE 1) | COMPARATIVE EXAMPLE 4C | EXAMPLE 4A | EXAMPLE 4B (EXAMPLE 1A) | EXAMPLE 4C |
|---|---|---|---|---|---|---|
| CONNECTED FIBER COUNT n [FIBER] | 1 | 1 | 1 | 1 | 1 | 1 |
| CONNECTING PITCH p [mm] | 30 | 50 | 70 | 30 | 50 | 70 |
| CONNECTING-PORTION LENGTH a [mm] | 6 | 10 | 14 | 6 | 10 | 14 |
| FIBER DIAMETER D [μm] | 205 | 205 | 205 | 205 | 205 | 205 |
| CENTER-TO-CENTER DISTANCE L [mm] | 0.280 | 0.280 | 0.280 | 0.280 | 0.280 | 0.280 |
| SPACING DISTANCE C [mm] | 0.075 | 0.075 | 0.075 | 0.075 | 0.075 | 0.075 |
| CONNECTING-PORTION YOUNG'S MODULUS E [MPa] | 900 | 900 | 900 | 900 | 900 | 900 |
| CONNECTING-PORTION SHRINKAGE RATE A [/°C] | 0.00011 | 0.00011 | 0.00011 | 0.00011 | 0.00011 | 0.00011 |
| CONNECTING-PORTION CROSS-SECTIONAL AREA S [mm$^2$] | 0.018 | 0.018 | 0.018 | 0.011 | 0.011 | 0.011 |
| CONNECTING PROPORTION R | 0.40 | 0.40 | 0.40 | 0.40 | 0.40 | 0.40 |
| VOLUME SHRINKAGE AMOUNT Vc [mm$^3$/piece·°C] | 0.000012 | 0.000020 | 0.000028 | 0.000007 | 0.000012 | 0.000017 |
| TOTAL VOLUME SHRINKAGE AMOUNT Vf [mm$^3$/m·°C] | 0.00080 | 0.00080 | 0.00080 | 0.00049 | 0.00049 | 0.00049 |
| EVALUATION RESULT (LOSS FLUCTUATION AMOUNT [dB/km]) | POOR (0.09) | POOR (0.08) | POOR (0.06) | GOOD (0.05) | GOOD (0.05) | GOOD (0.04) |

FIG. 12

| | COMPARATIVE EXAMPLE 5A | COMPARATIVE EXAMPLE 5B (COMPARATIVE EXAMPLE 1) | EXAMPLE 5A |
|---|---|---|---|
| CONNECTED FIBER COUNT n [FIBER] | 1 | 1 | 1 |
| CONNECTING PITCH p [mm] | 50 | 50 | 50 |
| CONNECTING-PORTION LENGTH a [mm] | 10 | 10 | 10 |
| FIBER DIAMETER D [μm] | 205 | 205 | 205 |
| CENTER-TO-CENTER DISTANCE L [mm] | 0.300 | 0.280 | 0.260 |
| SPACING DISTANCE C [mm] | 0.095 | 0.075 | 0.055 |
| CONNECTING-PORTION YOUNG'S MODULUS E [MPa] | 900 | 900 | 900 |
| CONNECTING-PORTION SHRINKAGE RATE A [/°C] | 0.00011 | 0.00011 | 0.00011 |
| CONNECTING-PORTION CROSS-SECTIONAL AREA S [mm$^2$] | 0.024 | 0.018 | 0.013 |
| CONNECTING PROPORTION R | 0.40 | 0.40 | 0.40 |
| VOLUME SHRINKAGE AMOUNT Vc [mm$^3$/piece·°C] | 0.000027 | 0.000020 | 0.000015 |
| TOTAL VOLUME SHRINKAGE AMOUNT Vf [mm$^3$/m·°C] | 0.00107 | 0.00080 | 0.00058 |
| EVALUATION RESULT (LOSS FLUCTUATION AMOUNT [dB/km]) | POOR (0.13) | POOR (0.08) | GOOD (0.04) |

FIG. 13

| | COMPARATIVE EXAMPLE 6A | EXAMPLE 6A | EXAMPLE 6B |
|---|---|---|---|
| CONNECTED FIBER COUNT n [FIBER] | 1 | 1 | 1 |
| CONNECTING PITCH p [mm] | 50 | 50 | 50 |
| CONNECTING-PORTION LENGTH a [mm] | 10 | 10 | 10 |
| FIBER DIAMETER D [μm] | 180 | 220 | 250 |
| CENTER-TO-CENTER DISTANCE L [mm] | 0.280 | 0.280 | 0.290 |
| SPACING DISTANCE C [mm] | 0.100 | 0.060 | 0.040 |
| CONNECTING-PORTION YOUNG'S MODULUS E [MPa] | 900 | 900 | 900 |
| CONNECTING-PORTION SHRINKAGE RATE A [/°C] | 0.00011 | 0.00011 | 0.00012 |
| CONNECTING-PORTION CROSS-SECTIONAL AREA S [mm²] | 0.025 | 0.014 | 0.015 |
| CONNECTING PROPORTION R | 0.40 | 0.40 | 0.40 |
| VOLUME SHRINKAGE AMOUNT Vc [mm³/piece·°C] | 0.000028 | 0.000015 | 0.000018 |
| TOTAL VOLUME SHRINKAGE AMOUNT Vf [mm³/m·°C] | 0.00112 | 0.00063 | 0.00070 |
| EVALUATION RESULT (LOSS FLUCTUATION AMOUNT [dB/km]) | POOR (0.14) | GOOD (0.03) | GOOD (0.02) |

FIG. 14

| | COMPARATIVE EXAMPLE 7A (COMPARATIVE EXAMPLE 6A) | COMPARATIVE EXAMPLE 7B | EXAMPLE 7A |
|---|---|---|---|
| CONNECTED FIBER COUNT n [FIBER] | 1 | 1 | 1 |
| CONNECTING PITCH p [mm] | 50 | 50 | 50 |
| CONNECTING-PORTION LENGTH a [mm] | 10 | 10 | 10 |
| FIBER DIAMETER D [μm] | 180 | 180 | 180 |
| CENTER-TO-CENTER DISTANCE L [mm] | 0.280 | 0.280 | 0.280 |
| SPACING DISTANCE C [mm] | 0.100 | 0.100 | 0.100 |
| CONNECTING-PORTION YOUNG'S MODULUS E [MPa] | 900 | 700 | 500 |
| CONNECTING-PORTION SHRINKAGE RATE A [/°C] | 0.00011 | 0.00009 | 0.00006 |
| CONNECTING-PORTION CROSS-SECTIONAL AREA S [mm$^2$] | 0.025 | 0.025 | 0.025 |
| CONNECTING PROPORTION R | 0.40 | 0.40 | 0.40 |
| VOLUME SHRINKAGE AMOUNT Vc [mm$^3$/piece·°C] | 0.000028 | 0.000022 | 0.000015 |
| TOTAL VOLUME SHRINKAGE AMOUNT Vf [mm$^3$/m·°C] | 0.00112 | 0.00087 | 0.00062 |
| EVALUATION RESULT (LOSS FLUCTUATION AMOUNT [dB/km]) | POOR (0.14) | POOR (0.09) | GOOD (0.04) |

FIG. 15

| | EXAMPLE 8A | EXAMPLE 8B | EXAMPLE 8C |
|---|---|---|---|
| CONNECTED FIBER COUNT n [FIBER] | 2 | 2 | 2 |
| CONNECTING PITCH p [mm] | 50 | 70 | 150 |
| CONNECTING-PORTION LENGTH a [mm] | 10 | 14 | 30 |
| FIBER DIAMETER D [μm] | 205 | 205 | 205 |
| CENTER-TO-CENTER DISTANCE L [mm] | 0.270 | 0.270 | 0.270 |
| SPACING DISTANCE C [mm] | 0.650 | 0.650 | 0.650 |
| CONNECTING-PORTION YOUNG'S MODULUS E [MPa] | 900 | 900 | 900 |
| CONNECTING-PORTION SHRINKAGE RATE A [/°C] | 0.00012 | 0.00012 | 0.00012 |
| CONNECTING-PORTION CROSS-SECTIONAL AREA S [mm²] | 0.017 | 0.017 | 0.017 |
| CONNECTING PROPORTION R | 0.20 | 0.20 | 0.20 |
| VOLUME SHRINKAGE AMOUNT Vc [mm³/piece·°C] | 0.000020 | 0.000029 | 0.000061 |
| TOTAL VOLUME SHRINKAGE AMOUNT Vf [mm³/m·°C] | 0.00041 | 0.00041 | 0.00041 |
| EVALUATION RESULT (LOSS FLUCTUATION AMOUNT [dB/km]) | GOOD (0.03) | GOOD (0.02) | GOOD (0.01) |

FIG. 16

| | COMPARATIVE EXAMPLE 9A | EXAMPLE 9A (EXAMPLE 8C) | EXAMPLE 9B |
|---|---|---|---|
| CONNECTED FIBER COUNT n [FIBER] | 2 | 2 | 2 |
| CONNECTING PITCH p [mm] | 150 | 150 | 150 |
| CONNECTING-PORTION LENGTH a [mm] | 60 | 30 | 10 |
| FIBER DIAMETER D [μm] | 205 | 205 | 205 |
| CENTER-TO-CENTER DISTANCE L [mm] | 0.270 | 0.270 | 0.270 |
| SPACING DISTANCE C [mm] | 0.650 | 0.650 | 0.650 |
| CONNECTING-PORTION YOUNG'S MODULUS E [MPa] | 900 | 900 | 900 |
| CONNECTING-PORTION SHRINKAGE RATE A [/°C] | 0.00012 | 0.00012 | 0.00012 |
| CONNECTING-PORTION CROSS-SECTIONAL AREA S [mm²] | 0.017 | 0.017 | 0.017 |
| CONNECTING PROPORTION R | 0.40 | 0.20 | 0.07 |
| VOLUME SHRINKAGE AMOUNT Vc [mm³/piece·°C] | 0.000122 | 0.000061 | 0.000020 |
| TOTAL VOLUME SHRINKAGE AMOUNT Vf [mm³/m·°C] | 0.00082 | 0.00041 | 0.00014 |
| EVALUATION RESULT (LOSS FLUCTUATION AMOUNT [dB/km]) | POOR (0.06) | GOOD (0.01) | GOOD (0.01) |

FIG. 17

INTERMITTENTLY CONNECTED OPTICAL FIBER RIBBON AND METHOD FOR MANUFACTURING INTERMITTENTLY CONNECTED OPTICAL FIBER RIBBON

TECHNICAL FIELD

The present invention relates to an intermittently connected optical fiber ribbon and a method for manufacturing the intermittently connected optical fiber ribbon.

BACKGROUND

Patent Literatures 1 to 6 describe optical fiber ribbons in which three or more optical fibers arranged side by side are intermittently connected together (intermittently connected optical fiber ribbons). Also, Patent Literature 7 describes achieving an optical fiber with low bending losses by adjusting the material and physical properties of a resin coating the optical fiber.

CITATION LIST

Patent Literature

PTL 1: Japanese Patent Application Publication No. 2015-219355
PTL 2: Japanese Patent Application Publication No. 2016-184170
PTL 3: Japanese Patent Application Publication No. 2017-026754
PTL 4: Japanese Patent Application Publication No. 2013-088617
PTL 5: Japanese Patent Application Publication No. 2016-001338
PTL 6: Japanese Patent Application Publication No. 2010-008923
PTL 7: Published Japanese Translation of PCT International Application No. 2009-510520

In order to package a large number of optical fibers into an optical cable with high density, it is desirable that the optical fibers be small in diameter. Meanwhile, because of peripherals of an optical fiber ribbon (e.g., a processing machine such as a fusion splicer and optical connectors such as ferrules), there are constraints on the gaps between the optical fibers (the center-to-center distance between the optical fibers) in the optical fiber ribbon. For this reason, when an optical fiber ribbon is configured using small-diameter optical fibers, the gap between adjacent optical fibers (the center-to-center distance between the optical fibers) is larger than the diameter of the optical fibers, and the outer circumferential portions of the adjacent optical fibers are thus spaced apart from each other.

In an intermittently connected optical fiber ribbon thus configured such that the outer circumferential portions of the optical fibers are spaced apart from each other, upon thermal shrinkage of connecting portions intermittently formed in the longitudinal direction, a load is applied to the optical fibers, causing the optical fibers to form a serpentine course, which consequently may increase microbending losses in the optical fibers.

Note that Patent Literatures 1 and 2 state that the shrinking force of the resin forming the coating member acts on marking and thus increases microbending losses in the optical fibers. However, because the outer circumferential portions of two adjacent optical fibers are in contact with each other in Patent Literatures 1 and 2, the optical fibers do not receive a load that causes the optical fibers to form a serpentine course even upon shrinkage of the resin forming the coating member.

SUMMARY

One or more embodiments of the present invention are related to reducing microbending losses in optical fibers in an intermittently connected optical fiber ribbon configured such that the outer circumferential portions of adjacent optical fibers are spaced apart from each other.

An intermittently connected optical fiber ribbon according to one or more embodiments comprises: a plurality of optical fibers arranged in a width direction; and connecting portions that intermittently connect two adjacent ones of the optical fibers, wherein a center-to-center distance between two adjacent ones of the optical fibers is greater than a diameter of the optical fibers, and a total of volume shrinkage amounts of the connecting portions per 1 meter of a single one of the optical fibers is 0.00070 $mm^3/m \cdot °C$. or lower.

Other features of the present invention will be demonstrated by the description to be given below and by the drawings.

The present invention can reduce microbending losses in optical fibers in an intermittently connected optical fiber ribbon configured such that the outer circumferential portions of adjacent optical fibers are spaced apart from each other.

BRIEF DESCRIPTION OF DRAWINGS

FIG. 6 is a diagram illustrating various parameters used in the description of examples.
FIG. 9 is a diagram illustrating examples and a comparative example in which the connecting-portion cross-sectional area S was changed.
FIG. 10 is a diagram illustrating examples and comparative examples in which a connecting-portion shrinkage rate A was changed.
FIG. 11 is a diagram illustrating examples and a comparative example in which a connecting proportion R was changed.
FIG. 12 is a diagram illustrating examples and comparative examples in which the connecting pitch p and the connecting-portion length a were changed.
FIG. 13 is a diagram illustrating an example and comparative examples in which a center-to-center distance L (and a spacing distance C) was changed.

FIG. 14 is a diagram illustrating examples and a comparative example in which a fiber diameter D was changed.

FIG. 15 is a diagram illustrating an example and comparative examples in which a total volume shrinkage amount Vf was changed with the fiber diameter D being 180 μm.

FIG. 16 is a diagram illustrating examples having a connected fiber count n of 2.

FIG. 17 is a diagram illustrating examples and a comparative example in which the total volume shrinkage amount Vf was changed with the connected fiber count n being 2.

DETAILED DESCRIPTION

Figure 1:
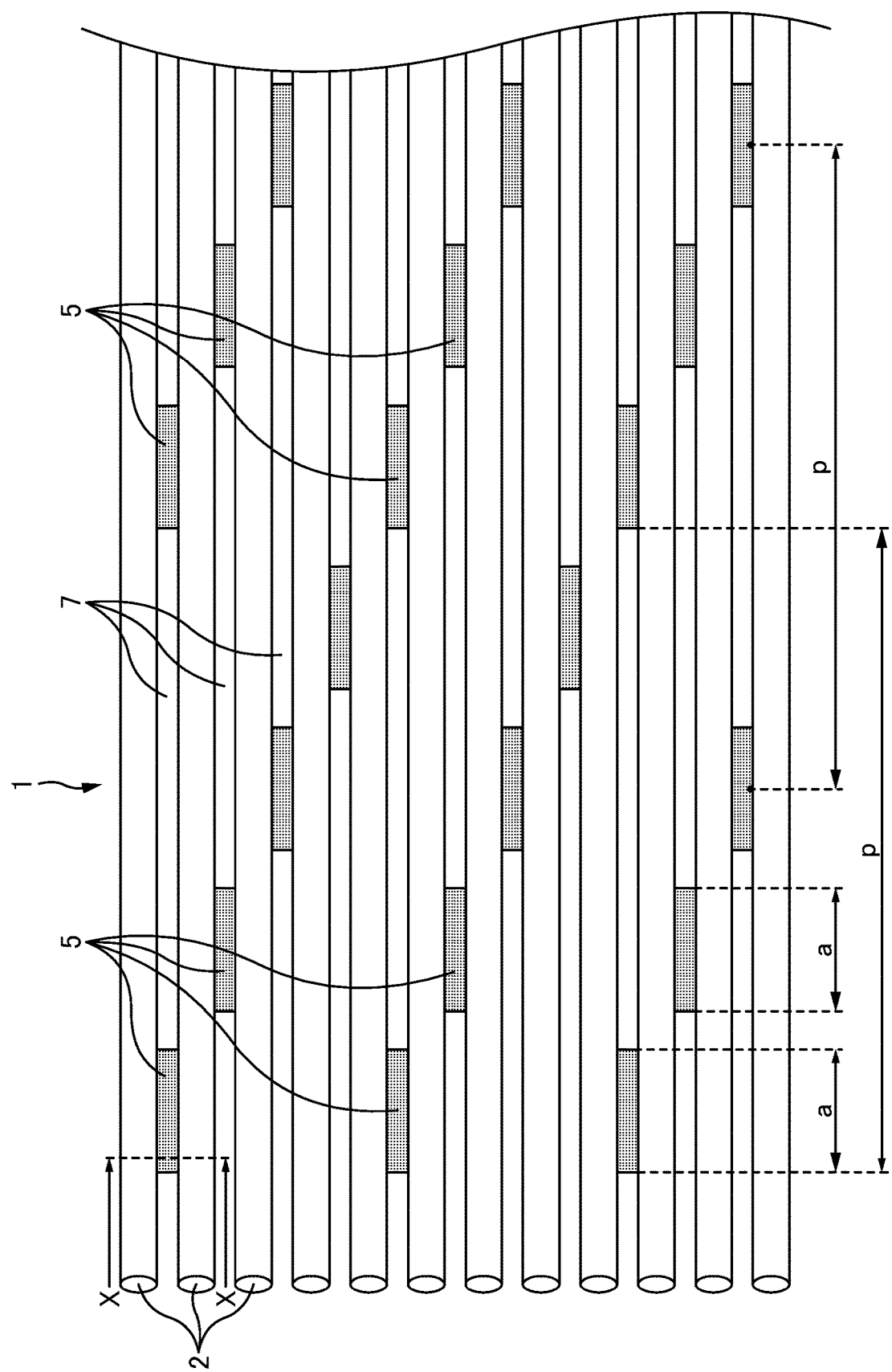
FIG. 1 is a diagram illustrating an intermittently connected optical fiber ribbon 1 in which single fibers are intermittently connected to one another.

The description to be given below and the drawings demonstrate at least the following points.

An intermittently connected optical fiber ribbon will become clear, comprising: a plurality of optical fibers arranged in a width direction; and connecting portions that intermittently connect two adjacent ones of the optical fibers, wherein a center-to-center distance between two adjacent ones of the optical fibers is greater than a diameter of the optical fibers, and a total of volume shrinkage amounts of the connecting portions per 1 meter of a single one of the optical fibers is 0.00070 mm$^3$/m·° C. or lower. Thus, when an intermittently connected optical fiber ribbon is configured with the outer circumferential portions of adjacent optical fibers being spaced apart from each other, microbending losses in the optical fibers can be reduced.

It is desirable that the single optical fibers are intermittently connected by the connecting portions, and Vf≤0.00070 where Vf (mm$^3$/m·° C.) is the total of volume shrinkage amounts of the connecting portions per 1 meter of a single one of the optical fibers and is expressed by Vf=S×A×1000×R, A (/° C.) is a shrinkage rate of each of the connecting portions per 1° C., S (mm$^2$) is a cross-sectional area of each of the connecting portions, R is a proportion of the connecting portions existing in a longitudinal direction of the optical fibers and expressed by R=(a/p)×2, p (mm) is a connecting pitch of the connecting portions arranged in the longitudinal direction, and a (mm) is a length of each of the connecting portions. Thus, when an intermittently connected optical fiber ribbon is configured in which single optical fibers are intermittently connected, microbending losses in the optical fibers can be reduced.

It is desirable that fiber pairs each formed by two optical fibers are intermittently connected by the connecting portions, and Vf≤0.00070 where Vf (mm$^3$/m·° C.) is the total of volume shrinkage amounts of the connecting portions per 1 meter of a single one of the optical fibers and is expressed by Vf=S×A×1000×R, A (1° C.) is a shrinkage rate of each of the connecting portions per 1° C., S (mm$^2$) is a cross-sectional area of each of the connecting portions, R is a proportion of the connecting portions existing in a longitudinal direction of the optical fibers and expressed by R=(a/p), p (mm) is a connecting pitch of the connecting portions arranged in the longitudinal direction, and a (mm) is a length of each of the connecting portions. Thus, when an intermittently connected optical fiber ribbon is configured in which pairs of two optical fibers are intermittently connected, microbending losses in the optical fibers can be reduced.

It is desirable that the diameter of the optical fibers is 220 μm or smaller. In such a case, it is particularly effective when the total of the volume shrinkage amounts of the connecting portions per 1 meter of a single optical fiber is 0.00070 mm$^3$/m·° C. or lower.

<Intermittently Connected Optical Fiber Ribbon>

FIG. 1 is a diagram illustrating an intermittently connected optical fiber ribbon 1 in which single optical fibers are intermittently connected to one another.

The intermittently connected optical fiber ribbon 1 is an optical fiber ribbon in which a plurality of optical fibers are arranged side by side and intermittently connected together. Two adjacent optical fibers 2 are connected by connecting portions 5. The plurality of connecting portions 5 that connect two adjacent optical fibers 2 are disposed intermittently in the longitudinal direction. The plurality of connecting portions 5 in the intermittently connected optical fiber ribbon 1 are intermittently disposed two-dimensionally in the longitudinal direction and the ribbon width direction. The connecting portions 5 are formed by applying an ultraviolet light curable resin to serve as an adhesive (a coupling agent) and then curing the resin by application of ultraviolet light. Note that it is also possible to form the connecting portions 5 with a thermoplastic resin. A non-connecting portion 7 is formed between the connecting portion 5 and the connecting portion 5 that are intermittently formed in the longitudinal direction. In other words, the connecting portion 5 and the non-connecting portion 7 are alternately disposed in the longitudinal direction. At the non-connecting portion 7, two adjacent optical fibers are not bound to each other. The non-connecting portion 7 is disposed in the ribbon width direction relative to a position where the connecting portion 5 is formed. This makes it possible to roll the optical fiber ribbon 1 into a bundle and therefore possible to house a large number of optical fibers 2 in an optical cable with high density.

Figure 2:
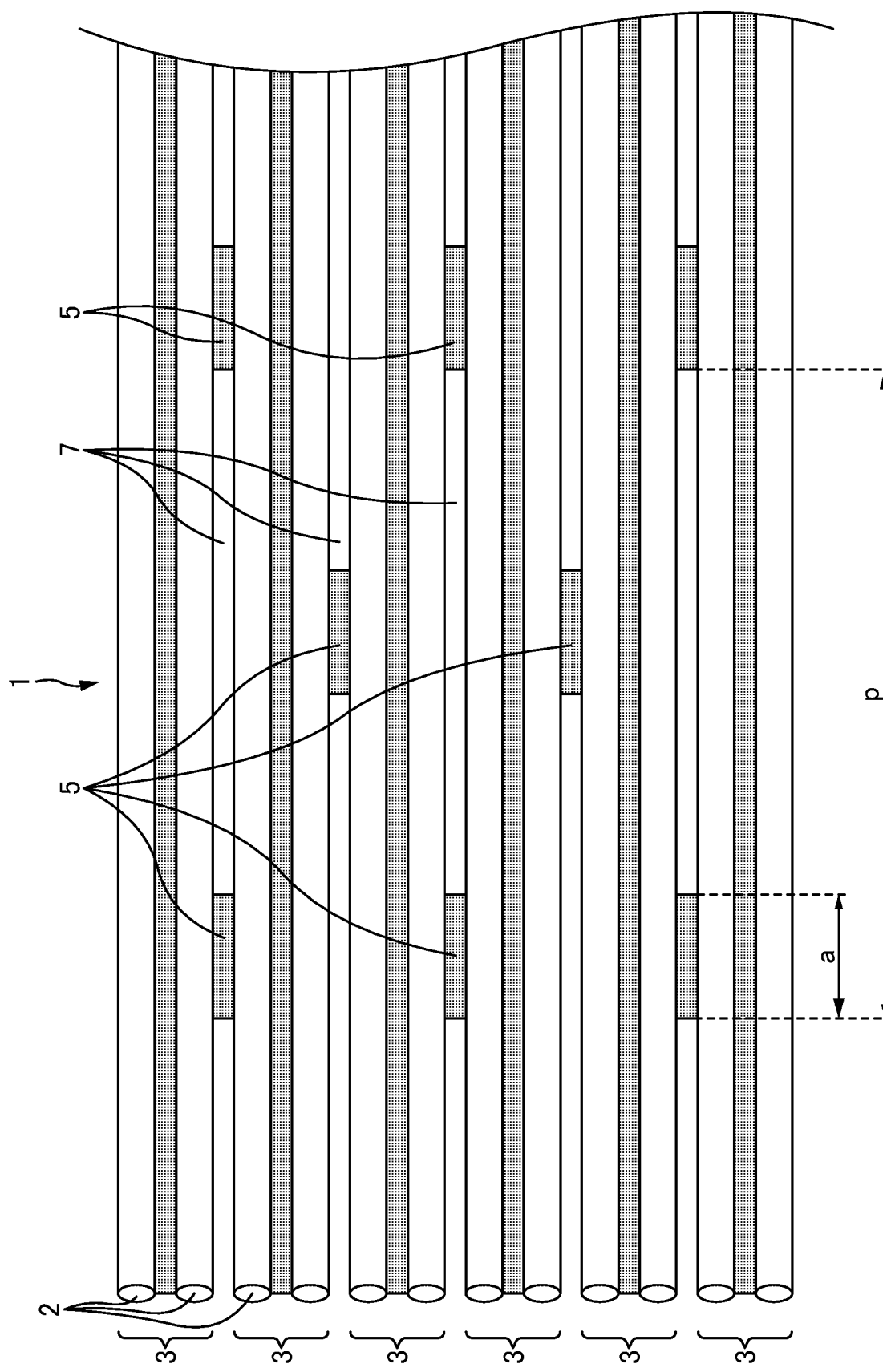
FIG. 2 is a diagram illustrating a different intermittently connected optical fiber ribbon 1.

FIG. 2 is a diagram illustrating a different intermittently connected optical fiber ribbon 1. This optical fiber ribbon 1 includes a plurality of (six here) pairs of two optical fibers 2 connected together continuously in the longitudinal direction (fiber pairs 3), and adjacent fiber pairs 3 are connected together intermittently with the connecting portions 5. In this intermittently connected optical fiber ribbon 1 as well, the non-connecting portion 7 is disposed in the ribbon width direction of a position where the connecting portion 5 is formed. This makes it possible to roll the optical fiber ribbon 1 into a bundle. Also, in this intermittently connected optical fiber ribbon 1 as well, the plurality of connecting portions 5 connecting adjacent fiber pairs 3 are disposed intermittently in the longitudinal direction, and the non-connecting portion 7 is formed between the connecting portion 5 and the connecting portion 5. In other words, in this intermittently connected optical fiber ribbon 1 as well, the connecting portion 5 and the non-connecting portion 7 are alternately disposed in the longitudinal direction.

Note that the intermittently connected optical fiber ribbon 1 is not limited to the ones shown in FIGS. 1 and 2. For example, the arrangement of the connecting portions 5 may be changed, or the number of optical fibers 2 may be changed.

Figure 3:
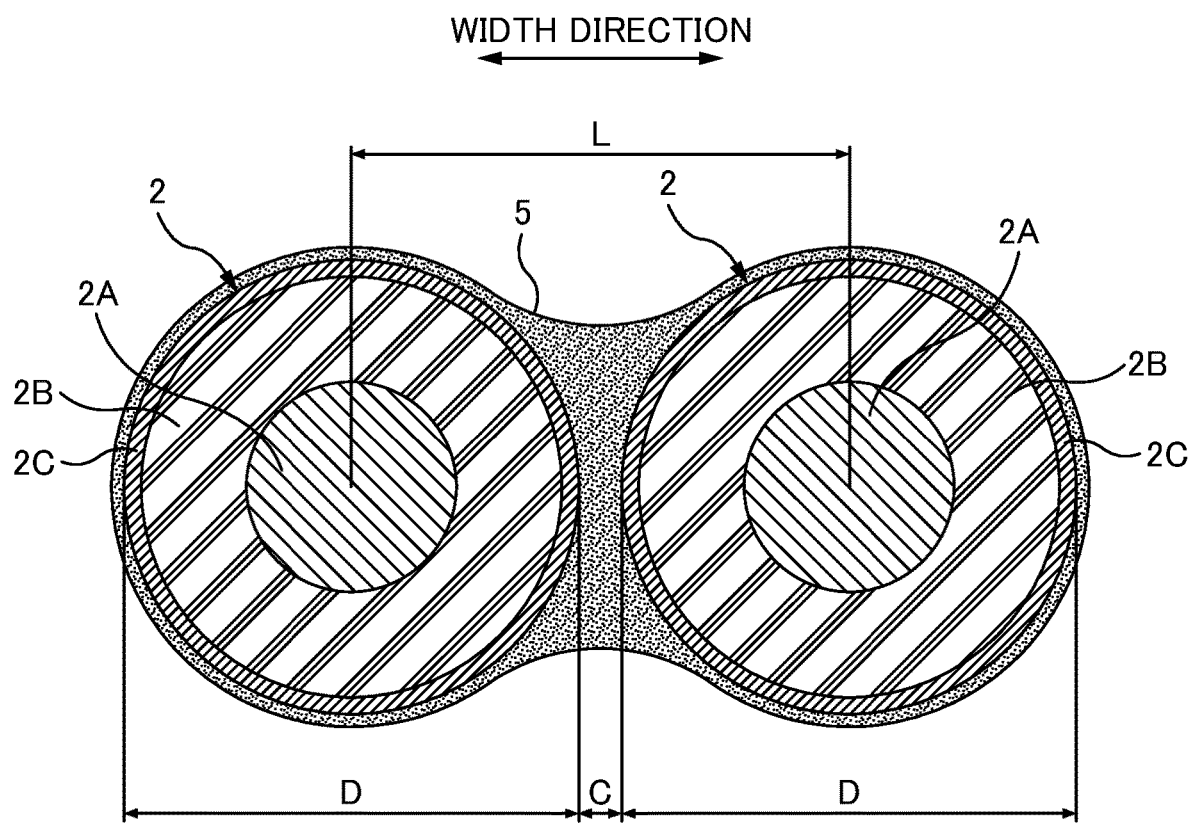
FIG. 3 is a sectional view taken along X-X in FIG. 1.

FIG. 3 is a sectional view taken along X-X in FIG. 1.

Each optical fiber 2 is formed by an optical fiber portion 2A, a coating layer 2B, and a colored layer 2C. The optical fiber portion 2A is formed by a core and a cladding. The diameter of the optical fiber portion 2A (cladding diameter) is, for example, approximately 125 μm. The coating layer 2B is a layer coating the optical fiber portion 2A. The coating layer 2B is formed by, for example, a primary coating layer (a primary coating) and a secondary coating layer (a secondary coating). The colored layer 2C is a layer formed on the surface of the coating layer 2B. The colored layer 2C is formed by application of a coloring material to the surface of the coating layer 2B. A marking may be formed between the coating layer 2B and the colored layer 2C. A coupling agent (ultraviolet light curable resin) is applied to and cured on the surface of the colored layer 2C. It should be noted that in the following description, the "diameter of the optical fiber 2" (or a fiber diameter) means the outer diameter of the colored layer 2C. The connecting portions 5 are formed between two optical fibers 2 by applying and curing a coupling agent (ultraviolet light curable resin).

In one or more embodiments, the center-to-center distance between the optical fibers 2 is greater than the diameter of the optical fiber 2. Thus, L>D where L is the center-to-center distance between the optical fibers 2 and D is the diameter of the optical fibers 2. When L>D, the outer circumferential surfaces (the surfaces of the colored layers 2C) of two optical fibers 2 connected by the connecting portions 5 are spaced apart from each other. In other words, C>0 where C is the spacing distance between the outer circumferential surfaces of two optical fibers 2 connected by the connecting portions 5. A description will be given later as to the shape and physical properties of the connecting portions 5 that connect two spaced-apart optical fibers 2.

<Method for Manufacturing the Optical Fiber Ribbon 1>

Figure 4A:
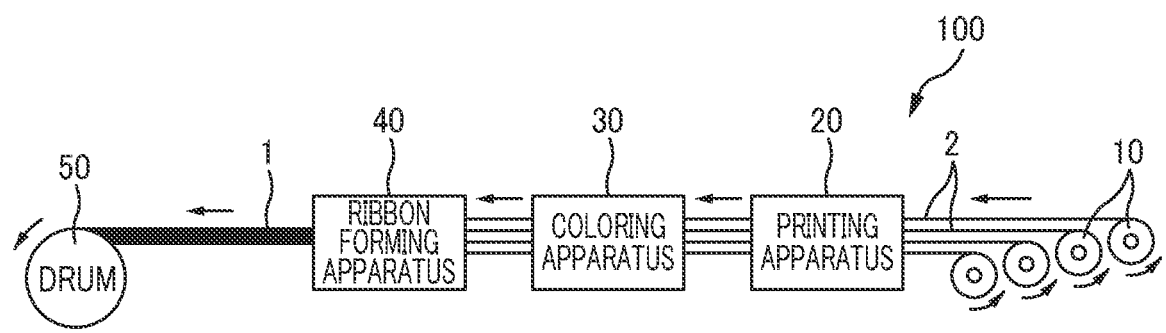
FIG. 4A is a diagram illustrating a manufacturing system 100 for manufacturing the intermittently connected optical fiber ribbon 1.

FIG. 4A is a diagram illustrating a manufacturing system 100 for manufacturing the intermittently connected optical fiber ribbon 1. For the simplification of the drawing, the manufacturing system 100 described here manufactures a four-fiber optical fiber ribbon.

The manufacturing system 100 has fiber supply devices 10, a printing apparatus 20, a coloring apparatus 30, a ribbon forming apparatus 40, and a drum 50.

The fiber supply devices 10 are devices (supply sources) that supply the optical fibers 2. Here, the fiber supply device 10 supplies a single optical fiber 2 (an optical fiber formed by the optical fiber portion 2A and the coating layer 2B; an optical fiber before the formation of the colored layer 2C). Alternatively, the fiber supply device 10 may supply a pair of two optical fibers 2 (the fiber pair 3). The fiber supply device 10 supplies the optical fiber 2 to the printing apparatus 20.

The printing apparatus 20 is an apparatus that prints a mark on the optical fiber 2. For example, the printing apparatus 20 prints a mark indicative of a ribbon number on each optical fiber 2. The plurality of optical fibers 2 marked by the printing apparatus 20 are supplied to the coloring apparatus 30.

The coloring apparatus 30 is an apparatus that forms the colored layers 2C of the optical fibers 2. The coloring apparatus 30 forms the colored layer 2C on each of the optical fibers 2 with an identification color for identification of the optical fiber 2. Specifically, the coloring apparatus 30 has coloring devices (not shown) for the respective optical fibers 2, and the coloring devices each apply a coloring agent (ultraviolet light curable resin) of a predetermined identification color to the surface of the corresponding optical fiber 2 (the surface of the coating layer 2B). The coloring apparatus 30 also has an ultraviolet light irradiation device (not shown), and the ultraviolet light irradiation device applies ultraviolet light to the coloring agent (the ultraviolet light curable resin) applied to each optical fiber 2 and cures the coloring agent, thereby forming the colored layer 2C. The optical fibers 2 colored by the coloring apparatus 30 are supplied to the ribbon forming apparatus 40. Alternatively, the colored optical fibers 2 may be supplied to the ribbon forming apparatus 40 from the fiber supply devices.

Figure 4B:
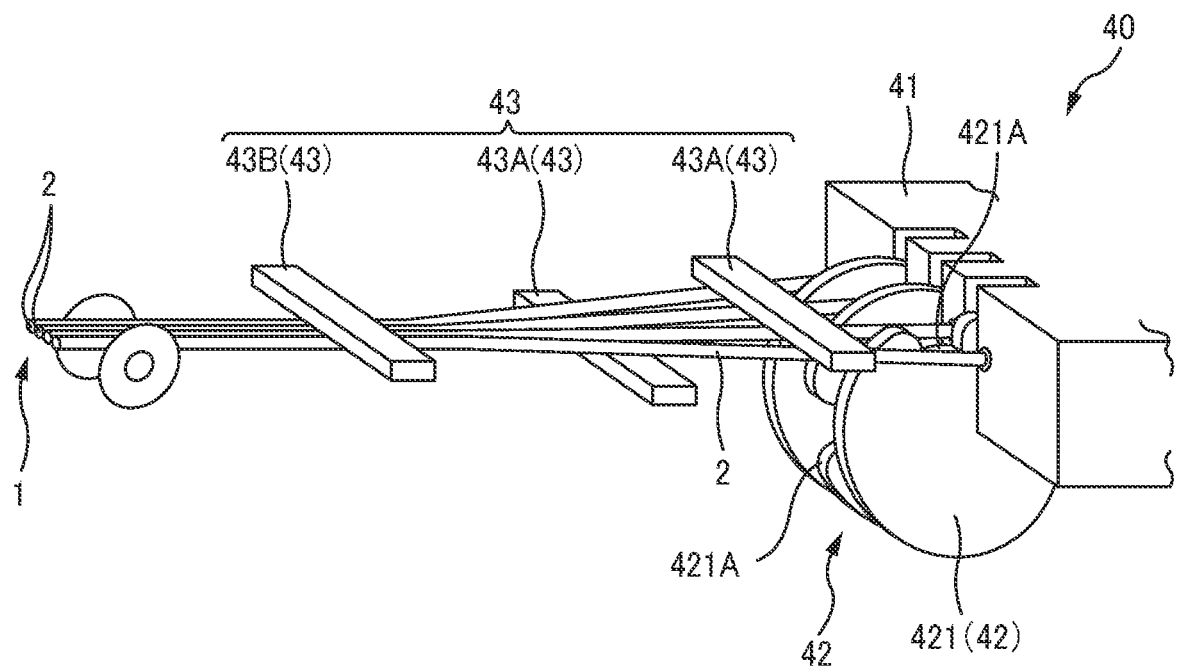
FIGS. 4B and 4C are diagrams illustrating a ribbon forming apparatus 40.
Figure 4C:
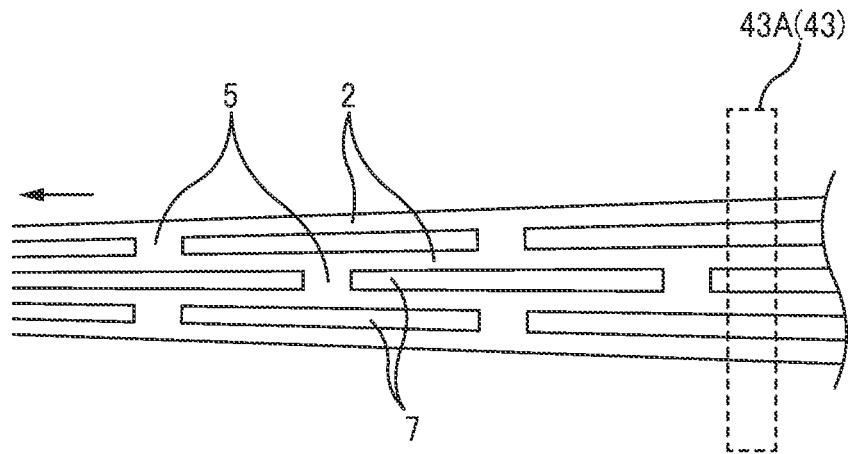

The ribbon forming apparatus 40 is an apparatus that manufactures the intermittently connected optical fiber ribbon 1 by forming the connecting portions 5 intermittently. Supplied to the ribbon forming apparatus 40 are the plurality of optical fibers 2 arranged in the width direction. FIGS. 4B and 4C are diagrams illustrating the ribbon forming apparatus 40. The ribbon forming apparatus 40 has an application device 41, a removal device 42, and light sources 43.

The application device 41 is a device that applies a coupling agent. The coupling agent is, for example, an ultraviolet light curable resin, and the connecting portion 5 is formed by curing of the coupling agent. The application device 41 applies the coupling agent in liquid form to the outer circumferences of the optical fibers 2 and to between adjacent ones of the optical fibers 2 continuously in the longitudinal direction by inserting the plurality of optical fibers 2 through coating dies filled with the liquid coupling agent.

The removal device 42 is a device that removes part of the coupling agent applied by the application device 41 while leaving part thereof. The removal device 42 has rotary blades 421 each with a recessed portion 421A (see FIG. 4B), and rotates the rotary blades 421 in conformity with the speed at which the optical fibers 2 are supplied. While the coupling agent applied by the application device 41 is removed by being blocked by the outer edges of the rotary blades 421, the coupling agent is left unremoved at the recessed portions 421A of the rotary blades 421. The part of the coupling agent left unremoved serves as the connecting portion 5 (see FIG. 1), and the part of the coupling agent removed serves as the non-connecting portion 7. Thus, the length and arrangement of the connecting portions 5 can be adjusted by adjustment of the rotation speed of the rotary blade 421 and the size of the recessed portion 421A.

The light sources 43 are devices that apply ultraviolet light to the coupling agent formed of the ultraviolet light curable resin. The light sources 43 have temporary curing light sources 43A and a full curing light source 43B. The temporary curing light sources 43A are disposed upstream of the full curing light source 43B. The coupling agent temporarily cures when irradiated with ultraviolet light by the temporary curing light sources 43A. The temporarily cured coupling agent is in a state of not being completely cured but being cured at the surface. The full curing light source 43B causes the coupling agent to cure fully by applying stronger ultraviolet light than the temporary curing light sources 43A. The fully cured ultraviolet light curable resin is in a state of being cured all the way through (although the fully cured coupling agent (the connecting portion 5) is moderately elastic, so that the intermittently connected optical fiber ribbon 1 can be rolled into a tube).

As shown in FIG. 4C, the optical fibers 2 immediately out of the application device 41 and the removal device 42 are spaced apart from each other. In this state, the temporary curing light sources 43A apply ultraviolet light to the coupling agent to temporarily cure the coupling agent. After the temporary curing of the coupling agent, the ribbon forming apparatus 40 gradually narrows the gaps between the optical fibers 2 and arranges the plurality of optical fibers 2 side by side, concentrating them into a ribbon form. The coupling agent is already temporarily cured; thus, even if the parts where the coupling agent has been removed (the non-connecting portions 7) come into contact with each other, they do not become connected together. Also, because the coupling agent is yet to be fully cured, the optical fibers 2 can be narrowed in gaps (concentrated) even at the regions connected with the coupling agent. Once the coupling agent cures fully by being irradiated with ultraviolet light by the full curing light source 43B, the intermittently connected optical fiber ribbon 1 shown in FIG. 1 is manufactured.

The drum 50 is a member that winds up the optical fiber ribbon 1 (see FIG. 4A). The optical fiber ribbon 1 manufactured by the ribbon forming apparatus 40 is wound up by the drum 50.

<Transmission Loss>

Figure 5A:
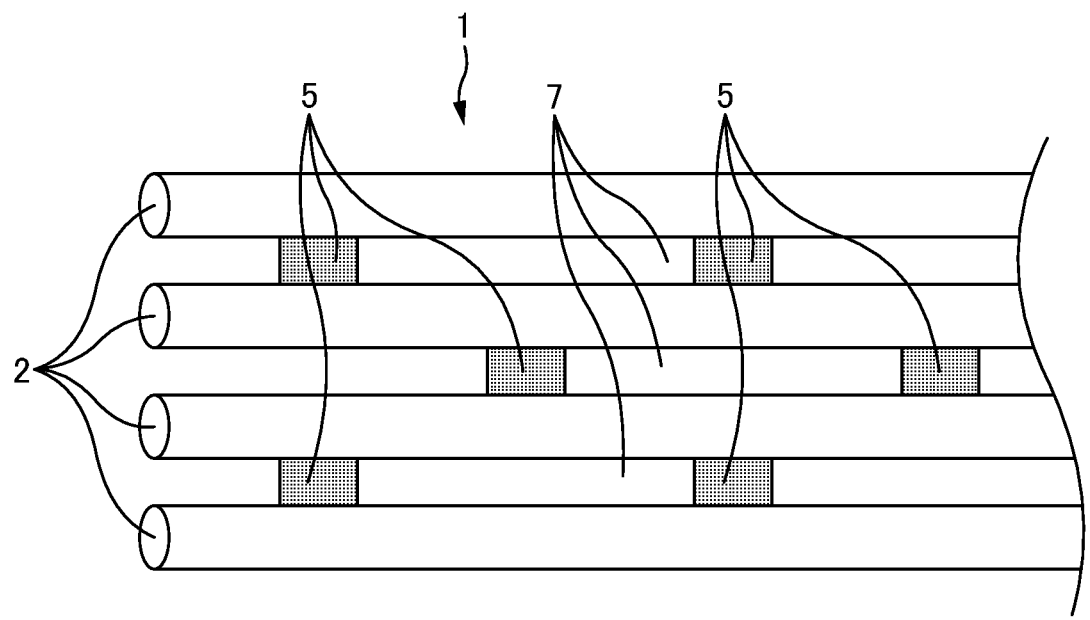
FIGS. 5A and 5B are conceptual diagrams of the influence of shrinkage of connecting portions 5.
Figure 5B:
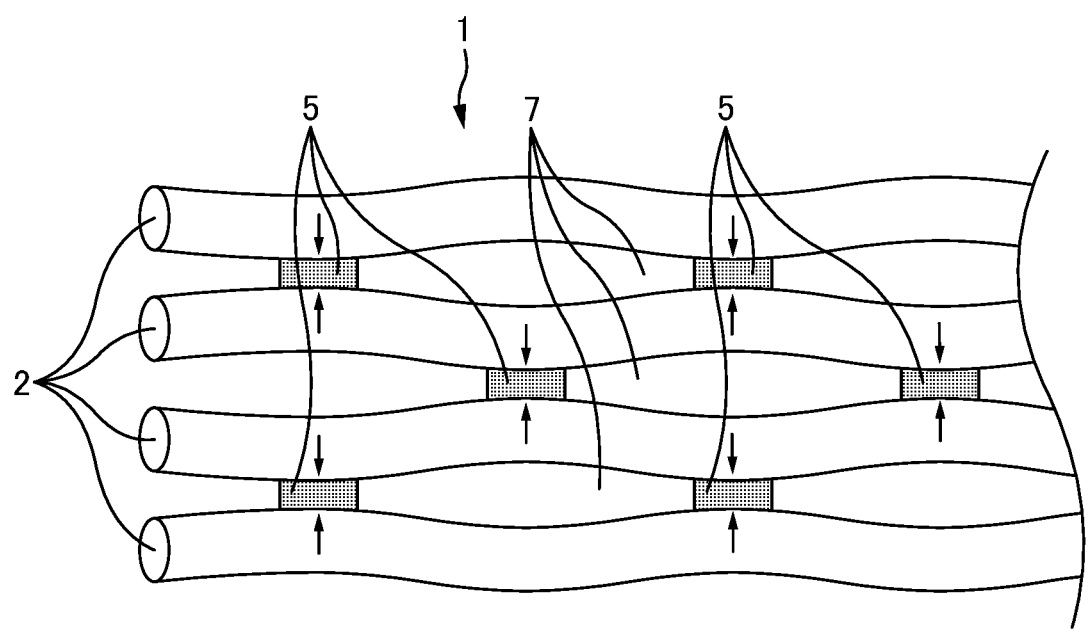

FIGS. 5A and 5B are conceptual diagrams illustrating the influence of shrinkage of the connecting portions 5. FIG. 5A is a diagram illustrating pre-shrunk connecting portions 5. FIG. 5B is a diagram illustrating shrunk connecting portions 5.

As shown in FIG. 5A (and FIG. 3), in the intermittently connected optical fiber ribbon 1, the connecting portions 5 connecting two adjacent optical fibers 2 are disposed intermittently. At the parts where the connecting portions 5 are formed, the optical fibers 2 are not coated evenly with the resin (coupling agent) for coating the optical fibers 2. Also, since the connecting portions 5 are formed intermittently in two-dimensional directions, the connecting portions 5 are, as seen from the optical fiber 2, disposed alternately in the ribbon width direction (alternately in the up-down direction in FIG. 5A) in the longitudinal direction. In addition, in one or more embodiments, as already described, the outer circumferential surfaces (the surfaces of the colored layers 2C) of two optical fibers 2 connected together by the connecting portions 5 are spaced apart from each other.

In the intermittently connected optical fiber ribbon 1 configured as shown in FIG. 5A such that the outer circumferential portions of the optical fibers 2 are spaced apart from each other, if the connecting portions 5 formed intermittently in the longitudinal direction thermally shrink, a load (lateral pressure) that causes the optical fiber 2 to form a serpentine course is exerted on the optical fiber 2 as shown in FIG. 5B, consequently increasing microbending losses in the optical fiber 2. Note that if the outer circumferential portions of two adjacent optical fibers 2 are in contact with each other (if the spacing distance C in FIG. 3 is zero; if the center-to-center distance L between the optical fibers 2 is equal to the diameter D of the optical fibers 2), shrinkage of the connecting portions 5 is unlikely to cause forming a serpentine course of the optical fibers 2 shown in FIG. 5B. Thus, the problem shown in FIG. 5B where microbending losses in the optical fibers 2 are increased by a load (a load that causes the optical fibers 2 to form a serpentine course) is a problem specific to the intermittently connected optical fiber ribbon 1 in which the outer circumferential portions of two adjacent optical fibers 2 are spaced apart from each other.

In addition, to package a large number of optical fibers 2 into an optical cable with high density, it is desirable that the optical fibers 2 be small in the diameter D (see FIG. 3). Meanwhile, in order to use a fusion splicer used heretofore or to use a multifiber ferrule used heretofore, the center-to-center distance L between the optical fibers 2 (see FIG. 3) needs to be close to what it is currently. As a result, reduction in the diameter of the optical fibers 2 causes the center-to-center distance L between the optical fibers 2 to be greater than the diameter D of the optical fibers 2 (L>D) and increases the spacing distance C between the outer circumferential surfaces of two optical fibers 2 (C>0). This results in a tendency to increase the amount of resin for the connecting portions 5 connecting the two spaced-apart optical fibers 2. Then, the increase in the amount of resin for the connecting portions 5 causes more load to be exerted on the optical fibers 2 when the connecting portions 5 shrink, which may contribute to an increase in microbending losses.

Further, reducing the diameter of the optical fiber 2 means reducing the thickness of the coating layer 2B of the optical fiber 2. Thus, reducing the diameter of the optical fiber 2 makes the optical fiber portion 2A of the optical fiber 2 (see FIG. 3) susceptible to the load. To be more specific, reducing the diameter of the optical fiber 2 not only increases the load exerted on the optical fiber 2 due to the increase in the amount of resin for the connecting portions 5, but also increases the influence on the load (microbending losses) due to the thickness reduction of the coating layer 2B. In other words, when the optical fiber 2 is reduced in diameter, microbending losses in the optical fiber 2 due to the load shown in FIG. 5B may increase synergistically.

To reduce microbending losses in the optical fiber 2, it is desirable to reduce the load shown in FIG. 5B (a load that causes the optical fiber 2 to form a serpentine course). Then, it is conceivable that the load exerted on the optical fiber 2 (the load shown in FIG. 5B) is smaller when the cross-sectional area of the connecting portion 5 is smaller. It is also conceivable that the load exerted on the optical fiber 2 (the load shown in FIG. 5B) is smaller when the proportion of the connecting portions 5 existing in the longitudinal direction is smaller. It is also conceivable that the load exerted on the optical fiber 2 (the load shown in FIG. 5B) is smaller when the thermal shrinkage rate of the connecting portion 5 is smaller. Thus, the inventors of the present application focused on a "total of the volume shrinkage amounts of the connecting portions 5 per unit length (1 m) of a single optical fiber 2" as a parameter having a correlation to the cross-sectional area of the connecting portion 5 (a connecting-portion cross-sectional area S), the proportion of the connecting portions 5 existing in the longitudinal direction (a connecting proportion R), and the shrinkage rate of the connecting portion 5 (a connecting-portion shrinkage rate A). Then, the inventors of the present application have found that microbending losses in the optical fiber 2 can be reduced when the "total of the volume shrinkage amounts of the connecting portions 5 per unit length (1 m) of a single optical fiber 2" is a predetermined value or lower. Specifically, as will be demonstrated in the following examples, microbending losses in the optical fiber 2 can be reduced when the "total of the volume shrinkage amounts of the connecting portions 5 per unit length (1 m) of a single optical fiber 2" is 0.00070 $mm^3/m \cdot °$ C. or lower.

Note that in the present embodiment, in the intermittently connected optical fiber ribbon 1 configured using small-diameter optical fibers 2, the "total of the volume shrinkage amounts of the connecting portions 5 per unit length (1 m) of a single optical fiber 2" is desirably 0.00070 $mm^3/m \cdot °$ C. or lower. It is assumed herein that the small-diameter optical fiber 2 is one with the diameter D of 220 μm or smaller (a typical optical fiber has a diameter of 250 μm). Thus, in one or more embodiments, in the intermittently connected optical fiber ribbon 1 configured using the optical fibers 2 whose diameter D is 220 μm or smaller such that the center-to-center distance L between the optical fibers 2 is greater than the diameter D of the optical fibers 2, the "total of the volume shrinkage amounts of the connecting portions 5 per unit length (1 m) of a single optical fiber 2" is desirably 0.00070 $mm^3/m \cdot °$ C. or lower.

<Various Parameters>

FIG. 6 is a diagram illustrating various parameters used in the description of the examples.

In the following description, the number of optical fibers 2 as a unit of connecting is referred to as the "connected fiber count n," and n=1 when the connecting unit is a single optical fiber 2 as shown in FIG. 1, and n=2 when the connecting unit is two optical fibers 2 (a fiber pair 3) as shown in FIG. 2. Thus, using the connected fiber count n, the structure of a 12-fiber intermittently connected optical fiber ribbon 1 can be represented as n fibers×12/n. The connected fiber count n is n=1 for the case of the intermittently connected optical fiber ribbon 1 shown in FIG. 1 and n=2 for the case of the intermittently connected optical fiber ribbon 1 shown in FIG. 2.

In the following description, as shown in FIG. 1, p denotes the connecting pitch of the connecting portions 5 arranged in the longitudinal direction (or the center-to-center distance between the connecting portions 5 in the longitudinal direction), and a denotes the length of each connecting portion 5. Note that a length b of the non-connecting portion 7 is b=p−a. In addition, as shown in FIG. 3, D is the diameter of the optical fiber 2 (fiber diameter), and L is the center-to-center distance between the optical fibers 2, and C is the distance by which the optical fibers 2 are spaced apart from each other. Note that in the following examples, the numerical values of the connecting pitch p, the length a of the connecting portion 5, the fiber diameter D, the center-to-center distance L, and the spacing distance C are measured values (actual measurement values).

Also, E denotes the Young's modulus of the connecting portion 5, and A is the rate of shrinkage of the connecting portion 5 per 1° C. Note that in the following examples, the numerical values of the Young's modulus E of the connecting portion 5 are each a nominal value of the coupling agent, whereas the numerical values of the connecting-portion shrinkage rate A are each a measured value (actual measurement value). Specifically, the connecting-portion shrinkage rate A is a value calculated as follows. A sample of cured coupling agent (the sample length: 5 mm) is set in a thermomechanical analyzer (Thermomechanical Analyzer TMA7100 manufactured by Hitachi High-Tech Science Corporation) and is measured for a change in length when the temperature is changed from 20° C. to −40° C. at a rate of 5° C. per minute under application of a constant load (tensile load) of 10 mN. Then, based on this measurement result (the amount of displacement of the 5-mm-long sample of the connecting portion 5 as a result of the temperature change of 60° C.), the connecting-portion shrinkage rate A is calculated as a rate of change (thermal shrinkage rate) of the connecting portion 5 per 1° C.

Figure 7A:
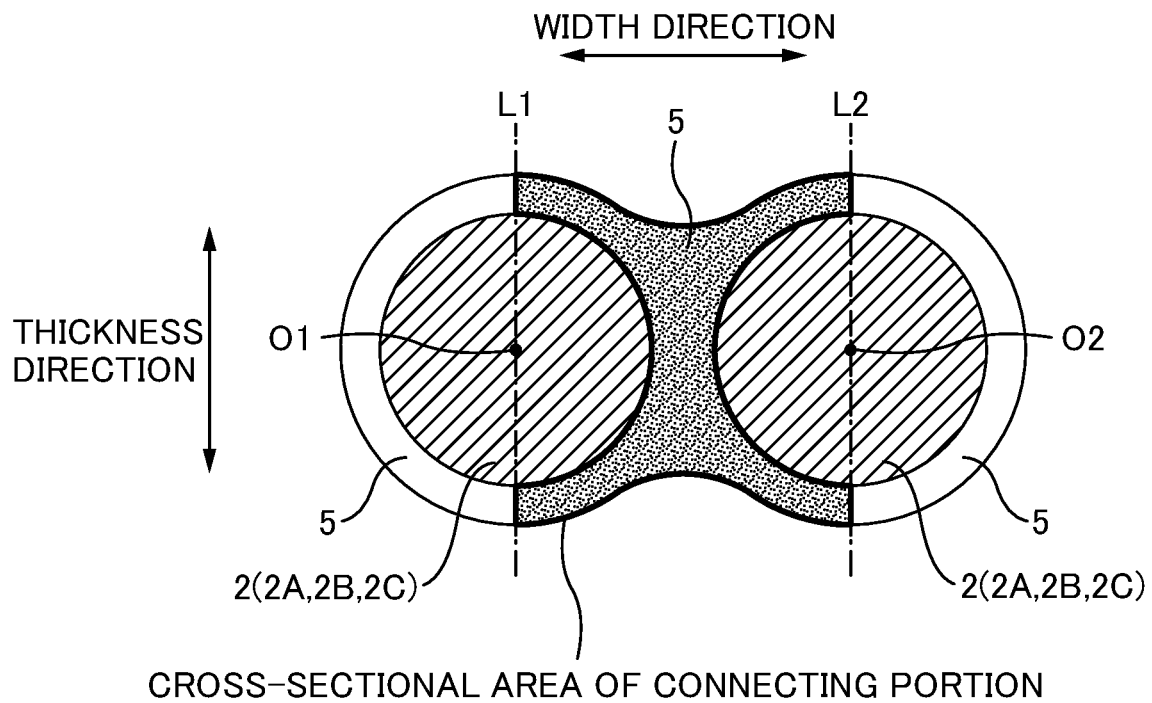
FIG. 7A is a diagram illustrating a connecting-portion cross-sectional area S.

In addition, S is the cross-sectional area of the connecting portion 5. FIG. 7A is a diagram illustrating the connecting-portion cross-sectional area S. The coupling agent (resin) forming the connecting portions 5 may be applied to the entire circumference of the optical fiber 2. Thus, the connecting portions 5 are the coupling agent (resin) between two imaginary lines L1, L2 that pass through the respective centers O1, O2 of two optical fibers 2 connected by the connecting portions 5 and that are parallel to a direction orthogonal to the ribbon width direction (a direction orthogonal to the direction in which the two optical fibers 2 are arranged; the thickness direction in FIG. 7A), and the connecting-portion cross-sectional area S is the area of a region surrounded by the imaginary lines L1, L2, the outer circumferential surfaces of the optical fibers 2 (the surfaces of the colored layers 2C), and the outer surface of the coupling agent (the region surrounded by the solid line in FIG. 7A). Note that in the following examples, the connecting-portion cross-sectional area S is a measured value (actual measurement value). Specifically, the connecting-portion cross-sectional area S is a numerical value obtained by cutting the two optical fibers 2 and the connecting portion 5 at the connecting portion 5, capturing an image of the cross section using a microscope, and measuring the connecting-portion cross-sectional area S on the captured image using an area calculation program.

Figure 7B:
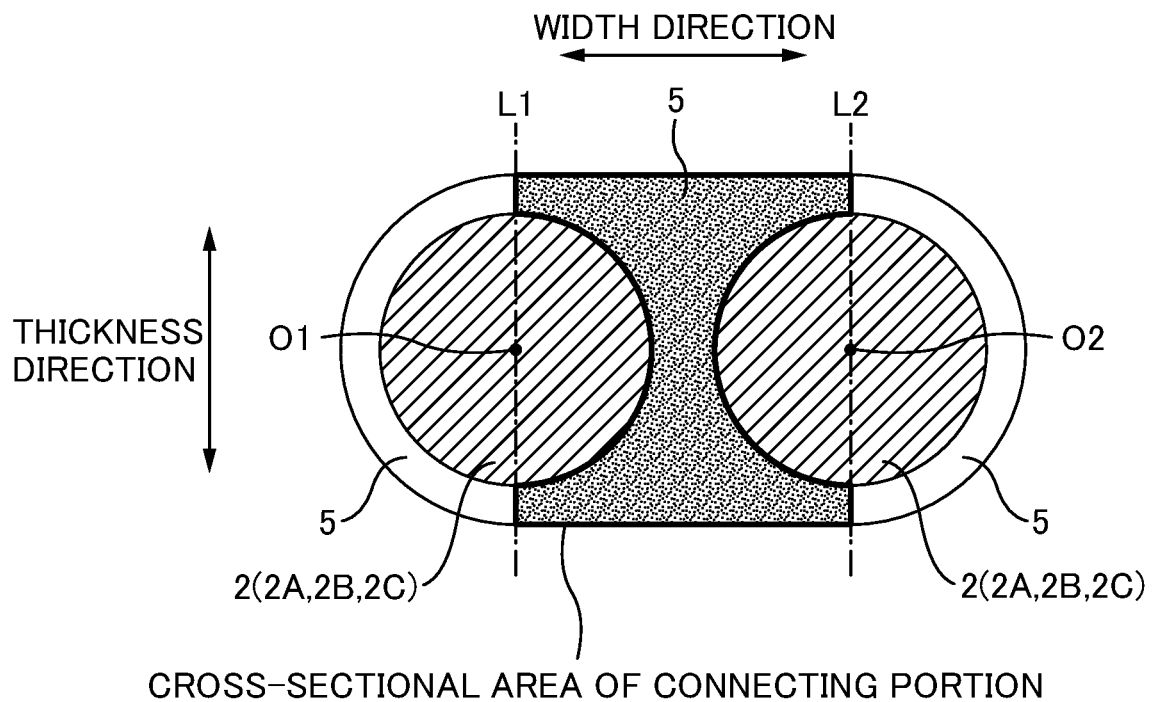
FIG. 7B is a diagram illustrating the connecting-portion cross-sectional area S for a case of a different cross-sectional shape.

Note that the shape of the cross section of the connecting portion 5 shown in FIG. 7A has depressed constrictions at the center portion, so that the surface of the connecting portion 5 is depressed. However, the shape of the cross section of the connecting portion 5 is not limited to this. For example, as shown in FIG. 7B, the connecting portion 5 may be formed to have a flat surface. In this case as well, the connecting portion 5 is the coupling agent (resin) between two imaginary lines L1, L2 that pass through the respective centers O1, O2 of two optical fibers 2 connected by the connecting portion 5 and that are parallel to a direction orthogonal to the ribbon width direction (a direction orthogonal to the direction in which the two optical fibers 2 are arranged; the thickness direction in FIG. 7B), and the connecting-portion cross-sectional area S is the area of a region surrounded by the imaginary lines L1, L2, the outer circumferential surfaces of the optical fibers 2 (the surfaces of the colored layers 2C), and the outer surface of the coupling agent (the region surrounded by the solid line in FIG. 7B).

Figure 8A:
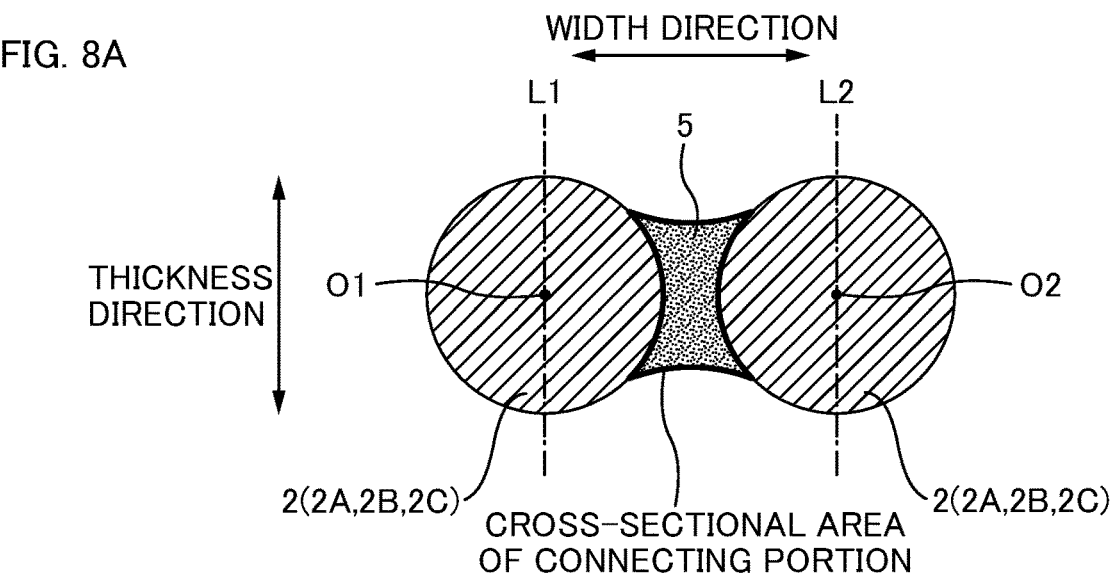
FIGS. 8A to 8C are diagrams illustrating the connecting portions 5 formed using different manufacturing methods.
Figure 8B:
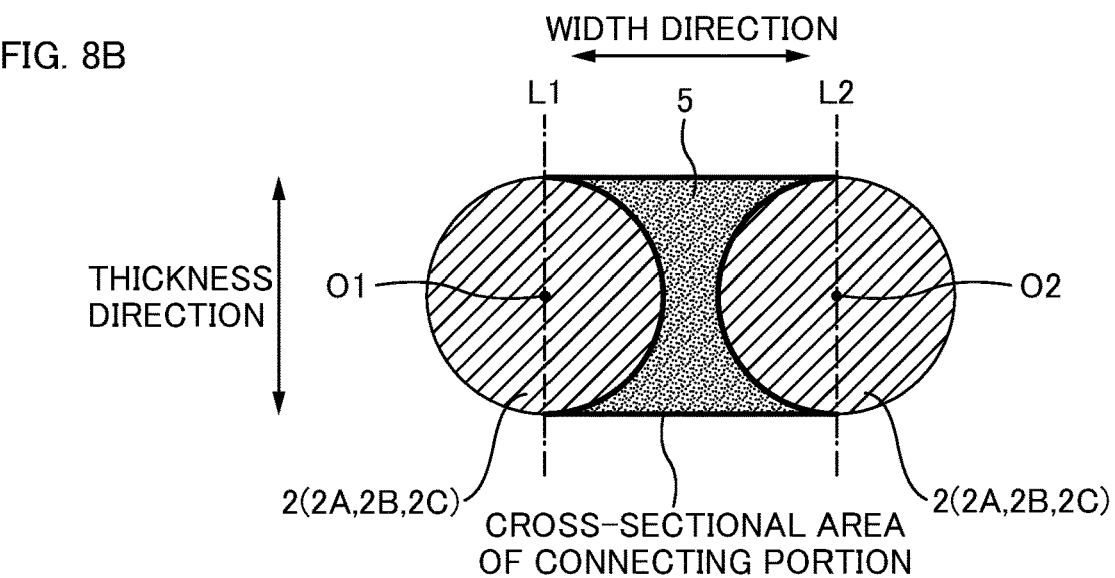
Figure 8C:
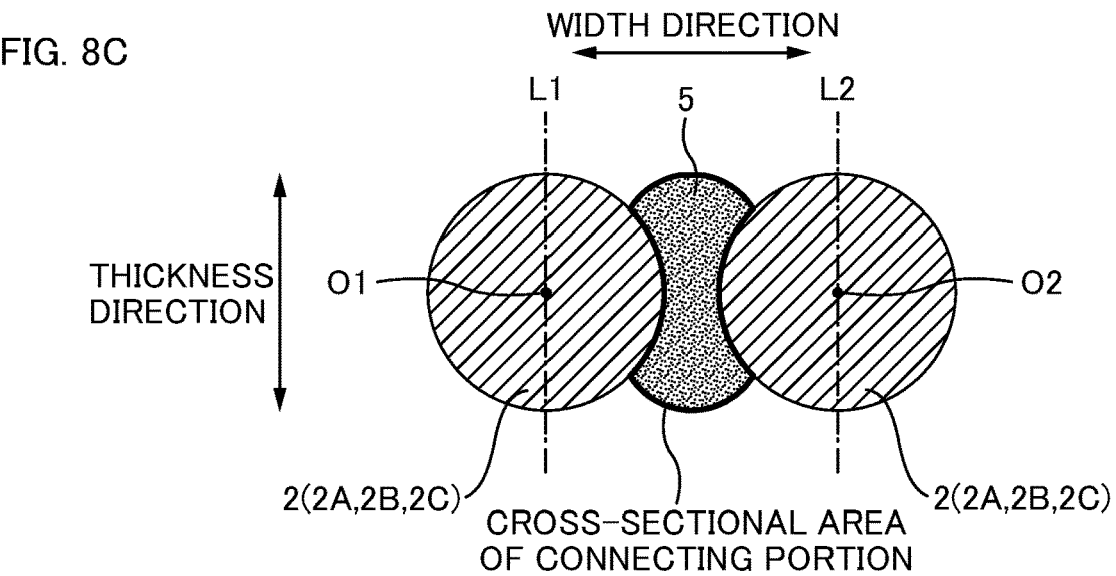

In one or more embodiments, as shown in FIG. 4B, after a liquid coupling agent is applied to the outer circumferences of the optical fibers 2 and to between the adjacent optical fibers 2, the rotary blade 421 having the recessed portion 421A removes part of the coupling agent applied to between the optical fibers 2 while leaving part thereof unremoved. For this reason, in one or more embodiments, as shown in FIGS. 7A and 7B, the resin (coupling agent) forming the connecting portions 5 is formed on the entire circumferences of the optical fibers 2. However, the shape and manufacturing method of the connecting portions 5 are not limited to these. For example, the coupling agent may be applied to between the optical fibers 2 using a dispenser to form the coupling agent only on part of the outer circumferences of the optical fibers 2 as shown in FIGS. 8A to 8C. In this case, the surface of the connecting portion 5 may be depressed as shown in FIG. 8A, the surface of the connecting portion 5 may be flat as shown in FIG. 8B, or the surface of the connecting portion 5 may be bulgy as shown in FIG. 8C. In these cases as well, the connecting portion 5 is the coupling agent (resin) between two imaginary lines L1, L2 that pass through the respective centers O1, O2 of two optical fibers 2 connected by the connecting portion 5 and that are parallel to a direction orthogonal to the ribbon width direction (a direction orthogonal to the direction in which the two optical fibers 2 are arranged; the thickness direction in FIGS. 8A to 8C), and the connecting-portion cross-sectional area S is the area of a region surrounded by the imaginary lines L1, L2, the outer circumferential surfaces of the optical fibers 2 (the surfaces of the colored layers 2C), and the outer surface of the coupling agent (the region surrounded by the solid line in FIGS. 8A to 8C). Note that in a different manufacturing method of the connecting portion 5, the coupling agent may be cured first, and then part of the connecting portions may be cut off.

The proportion of the connecting portions 5 existing in the longitudinal direction of the optical fiber 2 is referred to as the connecting proportion R. In the examples given below, the connecting proportion R is a value obtained by finding R=(a/p)×(2/n). Note that in the case of the intermittently connected optical fiber ribbon 1 shown in FIG. 1, the connecting portion 5 is formed on both sides of each optical fiber 2 in the ribbon width direction, and therefore the connecting proportion R is double the (a/p).

The shrinkage amount of a single connecting portion is referred to as a volume shrinkage amount Vc. In the following examples, the volume shrinkage amount Vc per connecting portion is a value obtained by finding Vc=S×a× A.

Also, Vf is a total of the volume shrinkage amounts of the connecting portions 5 per unit length (1 m) of a single optical fiber 2. In the following description, the total of the volume shrinkage amounts of the connecting portions 5 per unit length (1 m) of a single optical fiber 2 may be referred to as a "total volume shrinkage amount." The total volume shrinkage amount Vf can be calculated by finding Vf=Vc× (1000/p)×(2/n). Thus, the total volume shrinkage amount Vf can also be calculated by finding Vf=S×A×1000×R. As can be understood from this formula, the total volume shrinkage amount Vf is a value calculated based on the connecting-portion cross-sectional area S, the connecting proportion R, and the connecting-portion shrinkage rate A. The smaller the connecting-portion cross-sectional area S, the smaller the total volume shrinkage amount Vf. Also, the smaller the connecting proportion R, the smaller the total volume shrinkage amount Vf. Also, the smaller the connecting-portion shrinkage rate A, the smaller the total volume shrinkage amount Vf.

First Examples: Changing the Connecting-Portion Cross-Sectional Area S

FIG. 9 is a diagram illustrating examples and a comparative example in which the connecting-portion cross-sectional area S was changed.

As the examples and comparative example, the 12-fiber intermittently connected optical fiber ribbons 1 shown in FIG. 1 were fabricated (n=1). In all of the examples (and comparative example), the connecting pitch p was 50 mm, and the connecting-portion length a was 10 mm. Note that in all of the examples (and comparative example), the fiber diameter D was 205 µm, the center-to-center distance L was 280 µm, and the spacing distance C was 75 µm.

The connecting proportion R and the connecting-portion shrinkage rate A were common among the examples (and comparative example). Meanwhile, the connecting-portion cross-sectional area S was made different as follows: 0.018 mm² (Comparative Example 1), 0.011 mm² (Example 1A), and 0.008 mm² (Example 1B). As a result, the total volume shrinkage amount Vf was different as follows: 0.00080 mm³/m·° C. (Comparative Example 1), 0.00049 mm³/m·° C. (Example 1A), 0.00036 mm³/m·° C. (Example 1B). In other words, in these examples, the connecting-portion cross-sectional area S was changed to change the total volume shrinkage amount Vf.

To evaluate the examples (and comparative example), an optical cable including the intermittently connected optical fiber ribbon 1 of each of the examples (and comparative example) was subject to temperature change in two cycles of a range from −40° C. to 85° C., and during that time, the amount of loss fluctuation in the optical fibers 2 in the intermittently connected optical fiber ribbon 1 was measured. Here, the loss fluctuation amount (the maximum value) was rated "GOOD" when being 0.05 dB/km or lower and "POOR" when exceeding 0.05 dB/km. Because Telcordia GR-20-CORE Issue 4 (2013) states performing a cycling test on an optical cable in a range from −40° C. to 70° C., stricter conditions than this cycling test were used (temperature change in two cycles in a range from −40° C. to 85° C.). Also, standards stated in IEC 60793 (Edition 5, 2015) include "0.05 dB/km or lower," and thus the same loss fluctuation amount as this standard was used as the reference of the evaluation.

In Comparative Example 1, the loss fluctuation amount was 0.08 dB/km, and therefore the evaluation result was "POOR." By contrast, in Example 1A, the loss fluctuation amount was 0.05 dB/km, and therefore the evaluation result was "GOOD." In Example 1B, the loss fluctuation amount was 0.02 dB/km, and therefore the evaluation result was "GOOD." These evaluation results demonstrate that the smaller the connecting-portion cross-sectional area S, the smaller the loss fluctuation amount (dB/km). The evaluation results also demonstrate that the smaller the total volume shrinkage amount Vf, the smaller the loss fluctuation amount (dB/km). Note that the evaluation result was "GOOD (the loss fluctuation amount being 0.05 dB/km or lower)" when the total volume shrinkage amount Vf was 0.0070 mm³/m·° C. or lower.

Second Examples: Changing the Connecting-portion Shrinkage Rate A

FIG. 10 is a diagram illustrating examples and comparative examples in which the connecting-portion shrinkage rate A (or the connecting-portion Young's modulus E) was changed.

In these examples (and comparative examples) as well, the 12-fiber intermittently connected optical fiber ribbons 1 shown in FIG. 1 were fabricated (n=1). In all of the examples (and comparative examples), the connecting pitch p was 50 mm, and the connecting-portion length a was 10 mm. Note that in all of the examples (and comparative examples), the fiber diameter D was 205 µm, the center-to-center distance L was 280 µm, and the spacing distance C was 75 µm.

The connecting-portion cross-sectional area S and the connecting proportion R were common among the examples (and comparative examples). Meanwhile, the connecting-portion shrinkage rate A was made different as follows: 0.00015 (Comparative Example 2A), 0.00011 (Comparative Example 2B), 0.00009 (Example 2A), and 0.0006 (Example 2B). As a result, the total volume shrinkage amount Vf was different as follows: 0.00107 mm³/m·° C. (Comparative Example 2A), 0.00080 mm³/m·° C. (Comparative Example 2B), 0.00063 mm³/m·° C. (Example 2A), and 0.00045 mm³/m·° C. (Example 2B). In other words, in these examples, the connecting-portion shrinkage rate A was changed to change the total volume shrinkage amount Vf.

In Comparative Example 2A, the loss fluctuation amount was 0.10 dB/km, and therefore the evaluation result was "POOR." In Comparative Example 2B, the loss fluctuation amount was 0.08 dB/km, and therefore the evaluation result was "POOR." By contrast, in Example 2A, the loss fluctuation amount was 0.03 dB/km, and therefore the evaluation result was "GOOD." In Example 2B, the loss fluctuation amount was 0.02 dB/km, and therefore the evaluation result was "GOOD." These evaluation results demonstrate that the smaller the connecting-portion shrinkage rate A, the smaller the loss fluctuation amount (dB/km). The evaluation results also demonstrate that the smaller the total volume shrinkage amount Vf, the smaller the loss fluctuation amount (dB/km). Note that in these examples and comparative examples as well, the evaluation result was "GOOD (the loss fluctuation amount being 0.05 dB/km or lower)" when the total volume shrinkage amount was 0.0070 mm³/m·° C. or lower.

Third Examples: Changing the Connecting Proportion R

FIG. 11 is a diagram illustrating examples and a comparative example in which the connecting proportion R was changed.

In these examples (and comparative example) as well, the 12-fiber intermittently connected optical fiber ribbons 1 shown in FIG. 1 were fabricated (n=1). In all of the examples (and comparative example), the fiber diameter D was 205 µm, the center-to-center distance L was 280 µm, and the spacing distance C was 75 µm.

The connecting-portion cross-sectional area S and the connecting-portion shrinkage rate A were common among the examples (and comparative example). Meanwhile, the connecting proportion R was made different as follows: 0.40 (Comparative Example 3), 0.34 (Example 3A), and 0.27 (Example 3B). As a result, the total volume shrinkage amount Vf was different as follows: 0.00080 mm$^3$/m·° C. (Comparative Example 3), 0.00069 mm$^3$/m·° C. (Example 3A), and 0.00054 mm$^3$/m·° C. (Example 3B). In other words, in these examples, the connecting proportion R was changed to change the total volume shrinkage amount Vf.

In Comparative Example 3, the loss fluctuation amount was 0.08 dB/km, and therefore the evaluation result was "POOR." By contrast, in Example 3A, the loss fluctuation amount was 0.03 dB/km, and therefore the evaluation result was "GOOD." In Example 3B, the loss fluctuation amount was 0.01 dB/km, and therefore the evaluation result was "GOOD." These evaluation results demonstrate that the smaller the connecting proportion R, the smaller the loss fluctuation amount (dB/km). The evaluation results also demonstrate that the smaller the total volume shrinkage amount Vf, the smaller the loss fluctuation amount (dB/km). Note that in these examples and comparative example as well, the evaluation result was "GOOD (the loss fluctuation amount being 0.05 dB/km or lower)" when the total volume shrinkage amount was 0.0070 mm$^3$/m·° C. or lower.

Fourth Examples: Changing the Connecting Pitch p and the Connecting-Portion Length a FIG. 12 is a diagram illustrating examples and comparative examples in which the connecting pitch p and the connecting-portion length a were changed.

In these examples (and comparative examples) as well, the 12-fiber intermittently connected optical fiber ribbons 1 shown in FIG. 1 were fabricated (n=1). In all of the examples (and comparative examples), the fiber diameter D was 205 µm, the center-to-center distance L was 280 µm, and the spacing distance C was 75 µm.

In these examples (and comparative examples), the connecting pitch p was different as follows: 30 mm (Comparative Example 4A, Example 4A), 50 mm (Comparative Example 4B, Example 4B), and 70 mm (Comparative Example 4C, Example 4C). In addition, the connecting-portion length a was different as follows: 6 mm (Comparative Example 4A, Example 4A), 10 mm (Comparative Example 4B, Example 4B), and 14 mm (Comparative Example 4C, Example 4C). Note, however, that the connecting proportion R was 0.40 and common among the examples and (comparative examples).

The connecting-portion shrinkage rate A and the connecting proportion R were common among the examples (and comparative examples). Meanwhile, the connecting-portion cross-sectional area was different as follows: 0.018 mm$^2$ (Comparative Examples 4A to 4C) and 0.011 mm$^2$ (Examples 4A to 4C) (note that Comparative Examples 4A to 4C had a common connecting-portion cross-sectional area S, and Examples 4A to 4C had a common connecting-portion cross-sectional area S). As a result, the total volume shrinkage amount Vf was different between Comparative Examples and Examples as follows: 0.00080 mm$^3$/m·° C. (Comparative Examples 4A to 4C) and 0.00049 mm$^3$/m·° C. (Examples 4A to 4C) (note that Comparative Examples 4A to 4C had a common total volume shrinkage amount Vf, and Examples 4A to 4C had a common total volume shrinkage amount Vf).

In Comparative Examples 4A to 4C, the loss fluctuation amount exceeded 0.05 dB/km, and therefore the evaluation results were all "POOR." In other words, this confirms that when the total volume shrinkage amount Vf exceeds a predetermined value (e.g., 0.0070 mm$^3$/m·° C.), even if the connecting pitch p and the connecting-portion length a are changed, the loss fluctuation amount exceeds the predetermined value (0.05 dB/km), and the evaluation result comes out as "POOR."

By contrast, in Examples 4A to 4C, the loss fluctuation amount was 0.05 dB/km or lower, and therefore the evaluation results were all "GOOD." In other words, this confirms that when the total volume shrinkage amount Vf is the predetermined value (e.g., 0.0070 mm$^3$/m·° C.) or lower, even if the connecting pitch p and the connecting-portion length a are changed, the loss fluctuation amount equals or falls below the predetermined value (0.05 dB/km), and the evaluation amount comes out as "GOOD."

Note that between Example 4A and Example 4C (or between Comparative Example 4A and Comparative Example 4C), the connecting pitch p and the connecting-portion length a are two or more times different, but their difference in the loss fluctuation amount was very small. By contrast, as shown in the third examples described above (see FIG. 11), between Comparative Example 3, Example 3A, and Example 3B, the connecting proportion R is less than two times different, but due to the difference in the connecting proportion R, their difference in the loss fluctuation amount was large. This can confirm that the loss fluctuation amount has a correlation to the connecting proportion R, rather than being affected by the connecting pitch p or the connecting-portion length a (and thus can confirm that the loss fluctuation amount also has a correlation to the total volume shrinkage amount Vf).

Fifth Examples: Changing the Center-to-Center Distance L and the Spacing Distance C FIG. 13 is a diagram illustrating an example and comparative examples in which the center-to-center distance L (and the spacing distance C) was changed.

In this example (and comparative examples) as well, the 12-fiber intermittently connected optical fiber ribbons 1 shown in FIG. 1 were fabricated (n=1). In all of the examples (and comparative examples), the fiber diameter D was 205 µm, the connecting pitch p was 50 mm, and the connecting-portion length was 10 mm.

In these examples (and comparative examples), the center-to-center distance L was different as follows: 300 µm (Comparative Example 5A), 280 µm (Comparative Example 5B), and 260 µm (Example 5A). Due to the difference in the center-to-center distance L, in these examples (and comparative examples), the spacing distance C was different as follows: 95 µm (Comparative Example 5A), 75 µm, (Comparative Example 5B), and 55 µm (Example 5A).

The connecting proportion R and the connecting-portion shrinkage rate A were common among the examples (and comparative examples). Meanwhile, due to the center-to-center distance L (and the spacing distance C) being different, the connecting-portion cross-sectional area S was different as follows: 0.024 mm² (Comparative Example 5A), 0.018 mm² (Example 5B), and 0.013 mm² (Example 5A). As a result, the total volume shrinkage amount Vf was different as follows: 0.00107 mm³/m·° C. (Comparative Example 5A), 0.00080 mm³/m·° C. (Comparative Example 5B), and 0.00058 mm³/m·° C. (Example 5A). In other words, in these examples, the center-to-center distance L (and the spacing distance C) was changed to change the connecting-portion cross-sectional area S, thereby changing the total volume shrinkage amount Vf.

In Comparative Example 5A, the loss fluctuation amount was 0.13 dB/km, and therefore the evaluation result was "POOR." In Comparative Example 5B, the loss fluctuation amount was 0.08 dB/km, and therefore the evaluation result was "POOR." By contrast, in Example 5A, the loss fluctuation amount was 0.04 dB/km, and therefore the evaluation result was "GOOD." These evaluation results demonstrate that the smaller the connecting-portion cross-sectional area S, the smaller the loss fluctuation amount (dB/km). The evaluation results also demonstrate that the smaller the total volume shrinkage amount Vf, the smaller the loss fluctuation amount (dB/km). Note that in these examples (and comparative examples) as well, the evaluation result was "GOOD (the loss fluctuation amount being 0.05 dB/km or lower)" when the total volume shrinkage amount was 0.0070 mm³/m·° C. or lower.

Sixth Examples: Changing the Fiber Diameter D

FIG. 14 is a diagram illustrating examples and a comparative example in which the fiber diameter D was changed.

In these examples (and comparative example) as well, the 12-fiber intermittently connected optical fiber ribbons 1 shown in FIG. 1 were fabricated (n=1). In all of these examples (and comparative example), the connecting pitch p was 50 mm, and the connecting-portion length was 10 mm.

In these examples (and comparative example), the fiber diameter D was different as follows: 180 μm (Comparative Example 6A), 220 μm (Example 6A), and 250 μm (Example 6B). Also, due to the fiber diameter D being different, in these examples (and comparative example), the spacing distance C was different as follows: 100 μm (Comparative Example 6A), 60 μm (Example 6A), and 40 μm (Example 6B). Note that the center-to-center distance L was 280 μm in Comparative Example 6A and Example 6A, but was 290 μm in Example 6B.

The connecting proportion R and the connecting-portion shrinkage rate A were substantially common among the examples (and comparative example). Meanwhile, due to the spacing distance C being different, the connecting-portion cross-sectional area S was different as follows: 0.025 (Comparative Example 6A), 0.014 (Example 6A), and 0.015 (Example 6B). As a result, the total volume shrinkage amount Vf was different as follows: 0.00112 mm³/m·° C. (Comparative Example 6A), 0.00063 mm³/m·° C. (Example 6A), and 0.00070 mm³/m·° C. (Example 6B).

In Comparative Example 6A, the loss fluctuation amount was 0.14 dB/km, and therefore the evaluation result was "POOR." By contrast, in Example 6A, the loss fluctuation amount was 0.03 dB/km, and therefore the evaluation result was "GOOD." In Example 6B, the loss fluctuation amount was 0.02 dB/km, and therefore the evaluation result was "GOOD." These evaluation results demonstrate that the evaluation result was "GOOD (the loss fluctuation amount being 0.05 dB/km or lower)" when the total volume shrinkage amount was 0.0070 mm³/m·° C. or lower.

Seventh Examples: Changing the Total Volume Shrinkage Amount Vf in Small-Diameter Fiber FIG. 15 is a diagram illustrating an example and comparative examples in which the total volume shrinkage amount Vf was changed with the fiber diameter D being 180 μm.

In these examples (and comparative examples) as well, the 12-fiber intermittently connected optical fiber ribbons 1 shown in FIG. 1 were fabricated (n=1). In all of these examples (and comparative examples), the connecting pitch p was 50 mm, and the connecting-portion length a was 10 mm. Note that in all of these examples (and comparative examples), the fiber diameter D was 180 μm, the center-to-center distance L was 280 μm, and the spacing distance C was 100 μm.

The connecting-portion cross-sectional area S and the connecting proportion R were common among the examples (comparative examples). Meanwhile, the connecting-portion shrinkage rate A was made different as follows: 0.00011 (Comparative Example 7A), 0.00009 (Comparative Example 7B), and 0.00006 (Example 7A). As a result, the total volume shrinkage amount Vf was different as follows: 0.00112 mm³/m·° C. (Comparative Example 7A), 0.00087 mm³/m·° C. (Comparative Example 7B), and 0.00062 mm³/m·° C. (Example 7A). In other words, in these examples, the connecting-portion shrinkage rate A was changed to change the total volume shrinkage amount Vf.

In Comparative Example 7A, the loss fluctuation amount was 0.14 dB/km, and therefore the evaluation result was "POOR." In Comparative Example 7B, the loss fluctuation amount was 0.09 dB/km, and therefore the evaluation result was "POOR." By contrast, in Example 7A, the loss fluctuation amount was 0.04 dB/km, and therefore the evaluation result was "GOOD." These evaluation results demonstrate that in a case where the fiber diameter D is 180 μm, the smaller the connecting-portion shrinkage rate A, the smaller the loss fluctuation amount (dB/km), as in the case where the fiber diameter is 205 μm. The evaluation results also demonstrate that in a case where the fiber diameter D is 180 μm, the smaller the total volume shrinkage amount Vf, the smaller the loss fluctuation amount (dB/km), as in the case where the fiber diameter is 205 μm. Note that in these examples (and comparative examples) as well, the evaluation result was "GOOD (the loss fluctuation amount being 0.05 dB/km or lower)" when the total volume shrinkage amount was 0.0070 mm³/m·° C. or lower.

Eighth Examples: Changing the Connected Fiber Count n

FIG. 16 is a diagram illustrating examples having the connected fiber count n of 2.

In Examples 8A to 8C, the 12-fiber intermittently connected optical fiber ribbons 1 shown in FIG. 2 were fabricated (n=2). In Examples 8A to 8C, the fiber diameter D was 205 μm, the center-to-center distance L was 270 μm, and the spacing distance C was 65 μm. In Examples 8A to 8C, the connecting pitch p was different as follows: 50 mm (Example 8A), 70 mm (Example 8B), and 150 mm (Example 8C). The connecting-portion length a was also different as follows: 10 mm (Example 8A), 14 mm (Example 8B), and 30 mm (Example 8C). Note, however, that the connecting proportion R was 0.20 and common among Examples 8A to 8C. The connecting-portion cross-sectional area S, the connecting-portion shrinkage rate A, and the connecting proportion R were also common among Examples 8A to 8C. As a result, the total volume shrinkage amount Vf was 0.00041 mm$^3$/m·° C. and common among the Examples 8A to 8C. Then, in Examples 8A to 8C, the loss fluctuation amount was 0.05 dB/km or lower, and therefore the evaluation results were all "GOOD." In other words, this confirms that when the total volume shrinkage amount Vf is a predetermined value or lower (e.g., 0.0070 mm$^3$/m·° C. or lower), even if the connecting pitch p and the connecting-portion length a are changed, the loss fluctuation amount equals or falls below 0.05 dB/km, and the evaluation result comes out as "GOOD."

Ninth Examples: Changing the Total Volume Shrinkage Amount Vf when n=2

FIG. 17 is a diagram illustrating examples (and a comparative example) in which the total volume shrinkage amount Vf was changed with the connected fiber count n being 2.

In these examples (and comparative example), the 12-fiber intermittently connected optical fiber ribbons 1 shown in FIG. 2 were fabricated (n=2). In all the examples (and comparative example), the fiber diameter D was 205 μm, the center-to-center distance L was 270 μm, and the spacing distance C was 65 μm.

The connecting-portion cross-sectional area S and the connecting-portion shrinkage rate A were common among the examples (and comparative example). Meanwhile, the connecting proportion R was made different as follows: 0.40 (Comparative Example 9A), 0.20 (Example 9A), and 0.07 (Example 9B). As a result, the total volume shrinkage amount Vf was different as follows: 0.00082 mm$^3$/m·° C. (Comparative Example 9A), 0.00041 mm$^3$/m·° C. (Example 9A), and 0.00014 mm$^3$/m·° C. (Example 9B). In other words, in these examples, the connecting proportion R was changed to change the total volume shrinkage amount Vf.

In Comparative Example 9A, the loss fluctuation amount was 0.06 dB/km, and therefore the evaluation result was "POOR." By contrast, in Example 9A, the loss fluctuation amount was 0.01 dB/km, and therefore the evaluation result was "GOOD." In Example 9B, the loss fluctuation amount was 0.01 dB/km, and therefore the evaluation result was "GOOD." These evaluation results demonstrate that in a case where the connected fiber count n is 2, the smaller the connecting proportion R, the smaller the loss fluctuation amount (dB/km), as in the case where the connected fiber count n is 1. The evaluation results also demonstrate that in a case where the connected fiber count n is 2, the smaller the total volume shrinkage amount Vf, the smaller the loss fluctuation amount (dB/km), as in the case where the connected fiber count n is 1. Note that in these examples (and comparative example) as well, the evaluation result was "GOOD (the loss fluctuation amount being 0.05 dB/km or lower)" when the total volume shrinkage amount was 0.0070 mm$^3$/m·° C. or lower.

Between Example 8A and Example 8C described above and shown in FIG. 16, the connecting pitch p and the connecting-portion length a are approximately three times different, but their difference in the loss fluctuation amount was very small because the connecting proportion R and the total volume shrinkage amount Vf were substantially common. By contrast, in the ninth examples (Comparative Example 9A and Examples 9A, 9B), the connecting proportion R and the total volume shrinkage amount Vf were different, and as a result, their difference in the loss fluctuation amount was large. This can confirm that as is apparent from the examples given thus far, the loss fluctuation amount has a correlation to the total volume shrinkage amount Vf, rather than being affected by the connecting pitch p or the connecting-portion length a.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 optical fiber ribbon,
2 optical fiber,
2A optical fiber portion,
2B coating layer,
2C colored layer,
3 fiber pair,
5 connecting portion,
7 non-connecting portion,
10 fiber supply device,
20 printing apparatus,
30 coloring apparatus,
40 ribbon forming apparatus,
41 application device,
42 removal device,
421 rotary blade,
421A recessed portion,
43 light sources,
50 drum,
100 manufacturing system.

The invention claimed is:

1. An intermittently connected optical fiber ribbon comprising:
  optical fibers disposed side by side in a width direction of the optical fibers; and
  connecting portions that each intermittently connect two adjacent ones of the optical fibers, wherein
  a center-to-center distance between any of the two adjacent ones of the optical fibers is greater than a diameter of the individual optical fibers, and
  a total volume shrinkage per meter per 1° C. of the connecting portions of a single one of the optical fibers (Vf) is 0.00070 mm$^3$/m·° C. or lower.

2. The intermittently connected optical fiber ribbon according to claim 1, wherein
  each of the optical fibers is intermittently connected to an adjacent one of the optical fibers by the connecting portions, and
  Vf≤0.00070
  where:
    Vf (mm$^3$/m·° C.) is expressed by Vf=S×A×1000×R,
    A (/° C.) is a shrinkage rate of each of the connecting portions per 1° C.,
    S (mm$^2$) is a cross-sectional area of each of the connecting portions,
    R is a proportion of the connecting portions existing in a longitudinal direction of the optical fibers and expressed by R=(a/p)×2, p (mm) is a connecting pitch of the connecting portions arranged in the longitudinal direction, and a (mm) is a length of each of the connecting portions.

3. The intermittently connected optical fiber ribbon according to claim 1, wherein each of the optical fibers forms a pair with an adjacent one of the optical fibers, each of the pairs is intermittently connected to an adjacent one of the pairs by the connecting portions, and $Vf \leq 0.00070$ where:

$Vf$ (mm$^3$/m·° C.) is expressed by $Vf = S \times A \times 1000 \times R$,

A (/° C.) is a shrinkage rate of each of the connecting portions per 1° C.,

S (mm$^2$) is a cross-sectional area of each of the connecting portions,

R is a proportion of the connecting portions existing in a longitudinal direction of the optical fibers and expressed by $R = (a/p)$, p (mm) is a connecting pitch of the connecting portions arranged in the longitudinal direction, and a (mm) is a length of each of the connecting portions.

4. The intermittently connected optical fiber ribbon according to claim 1, wherein the diameter of each of the optical fibers is 220 μm or smaller.

5. A method for manufacturing an intermittently connected optical fiber ribbon, comprising:

supplying optical fibers; and forming the intermittently connected optical fiber ribbon by connecting the optical fibers with connecting portions that intermittently connect two adjacent ones of the optical fibers, wherein a center-to-center distance between the two adjacent ones of the optical fibers is greater than a diameter of each of the two adjacent ones of the optical fibers, and a total volume shrinkage per meter per 1° C. of the connecting portions of a single one of the optical fibers is 0.00070 mm$^3$/m·° C. or lower.

* * * * *